(12) United States Patent
Vucina et al.

(10) Patent No.: US 7,970,639 B2
(45) Date of Patent: Jun. 28, 2011

(54) PROJECT MANAGEMENT SYSTEMS AND METHODS

(76) Inventors: Mark A Vucina, Pacific Grove, CA (US); Diana K Vucina, Pacific Grove, CA (US)

( * ) Notice: Subject to any disclaimer, the term of this patent is extended or adjusted under 35 U.S.C. 154(b) by 1681 days.

(21) Appl. No.: 11/142,686

(22) Filed: Jun. 1, 2005

(65) Prior Publication Data
US 2006/0041447 A1    Feb. 23, 2006

Related U.S. Application Data

(60) Provisional application No. 60/603,427, filed on Aug. 20, 2004.

(51) Int. Cl.
*G06Q 10/00* (2006.01)
(52) U.S. Cl. ........................................ 705/7.13
(58) Field of Classification Search ................ 705/8
See application file for complete search history.

(56) References Cited

U.S. PATENT DOCUMENTS

| | | | | |
|---|---|---|---|---|
| 4,311,469 A | * | 1/1982 | Bibbee | 434/404 |
| 4,451,067 A | | 5/1984 | Williams | |
| 4,914,563 A | * | 4/1990 | Karmarkar et al. | 700/28 |
| 4,937,743 A | | 6/1990 | Rassman et al. | |
| 5,016,170 A | | 5/1991 | Pollanis et al. | |
| 5,712,985 A | * | 1/1998 | Lee et al. | 705/7 |
| 5,745,110 A | | 4/1998 | Ertemalp | |
| 5,819,232 A | * | 10/1998 | Shipman | 705/8 |
| 6,195,609 B1 | * | 2/2001 | Pilley et al. | 701/120 |
| 6,211,887 B1 | | 4/2001 | Meier et al. | |
| 6,392,651 B1 | | 5/2002 | Stradley | |
| 6,714,829 B1 | | 3/2004 | Wong | |
| 6,798,413 B1 | * | 9/2004 | Tracey et al. | 345/440 |
| 6,978,245 B1 | * | 12/2005 | Tsuchiya et al. | 705/8 |
| 7,046,248 B1 | | 5/2006 | Perttunen | |
| 7,120,879 B2 | * | 10/2006 | Gutberlet et al. | 715/853 |
| 7,143,091 B2 | * | 11/2006 | Charnock et al. | 1/1 |
| 7,353,457 B2 | | 4/2008 | Scheu et al. | |
| 7,409,679 B2 | * | 8/2008 | Chedgey et al. | 717/144 |
| 2002/0054040 A1 | | 5/2002 | Moshal et al. | |
| 2002/0062463 A1 | * | 5/2002 | Hines | 714/38 |
| 2002/0065697 A1 | * | 5/2002 | Cautley et al. | 705/7 |
| 2002/0082892 A1 | * | 6/2002 | Raffel et al. | 705/8 |
| 2002/0143604 A1 | * | 10/2002 | Cox et al. | 705/10 |
| 2003/0016247 A1 | * | 1/2003 | Lai et al. | 345/764 |
| 2003/0067481 A1 | * | 4/2003 | Chedgey et al. | 345/738 |
| 2003/0083917 A1 | * | 5/2003 | Tracey et al. | 705/7 |
| 2003/0130883 A1 | * | 7/2003 | Schroeder et al. | 705/10 |
| 2004/0030741 A1 | * | 2/2004 | Wolton et al. | 709/202 |

(Continued)

OTHER PUBLICATIONS

"Modeling User Goals for Notification System Interfaces", psu.edu [PDF], CM Chewar—2003—Citeseer.*

(Continued)

*Primary Examiner* — Jonathan G Sterrett
(74) *Attorney, Agent, or Firm* — Chad R. Walsh; Fountainhead Law Group P.C.

(57) ABSTRACT

Embodiments of the present invention provide improved project management systems and methods. In one embodiment the present invention includes a project management system comprising a plurality of radial task regions displayed around a focal point and a plurality of time regions displayed around the focal point, wherein each time region represents a period of time. The present invention may be implemented in software or as a project management template provided on a sheet of material such as paper.

30 Claims, 31 Drawing Sheets

U.S. PATENT DOCUMENTS

| | | | |
|---|---|---|---|
| 2004/0036721 A1* | 2/2004 | Anderson et al. | 345/848 |
| 2004/0083480 A1 | 4/2004 | Dodge | |
| 2004/0090472 A1* | 5/2004 | Risch et al. | 345/853 |
| 2004/0119713 A1 | 6/2004 | Meyringer | |
| 2004/0162768 A1* | 8/2004 | Snyder et al. | 705/28 |
| 2004/0254823 A1* | 12/2004 | Tracey et al. | 705/7 |
| 2005/0102316 A1* | 5/2005 | Lawson et al. | 707/102 |
| 2005/0108082 A1* | 5/2005 | Jenkinson | 705/10 |
| 2005/0182773 A1* | 8/2005 | Feinsmith | 707/100 |
| 2006/0069603 A1* | 3/2006 | Williams et al. | 705/9 |
| 2006/0077095 A1* | 4/2006 | Tucker et al. | 342/357.08 |

OTHER PUBLICATIONS

MoireGraphs: Radial focus+ context visualization and interaction for graphs . . . psu.edu [PDF] TJ Jankun-Kelly, KL MA - . . . IEEE Symposium on Information Visualization, 2003—Citeseer.*

An interaction view on information visualization psu.edu [PDF] R Kosara, H Hauser, D Gresh—State-of-the-Art Report. Proceedings of . . . , 2003—Citeseer.*

"Focus+Context display and navigation techniques for enhancing radial, space-filling hierarchy", J Stasko, E Zhang - . . . on Information Visualization, 2000—doi.ieeecomputersociety.org.*

A radial focus+ context visualization for multi-dimensional functions vt.edu [PDF] S Jayaraman, C North—Proceedings of the . . . , 2002—doi.ieeecomputersociety.org.*

Visual information foraging in a focus+ context visualizationpsu.edu [PDF] P Pirolli, SK Card, MM Van Der Wege—Proceedings of the SIGCHI . . . , 2001—portal.acm.org.*

Treemap, Radial Tree, and 3D Tree Visualizations psu.edu [PDF] N Sheth, K Börner, J Baumgartner, K Mane, E . . . - . . . Information Visualization . . . , 2003—Citeseer.*

Visualization of large graphs psu.edu [PDF] O Novak—2002—Citeseer.*

Interactive visualization of large graphs and networkspsu.edu [PDF] T Munzner—2000—Citeseer.*

About CiteSeerX, retrieved from http://citeseerx.ist.psu.edu/about/site.*

Version history of Chewar's "Modeling User Goals for Notification System Interfaces", retrieved from the web at http://citeseerx.ist.psu.edu/viewdoc/versions?doi=10.1.1.122.6264.*

Office Action mailed Nov. 17, 2008, on related U.S. Appl. No. 11/167,651, filed Jun. 27, 2005, for Mark Vucina et al.

* cited by examiner

700

| | | | | | |
|---|---|---|---|---|---|
| 1802a | 1 | Ace Survey 1803a | | | |
| | | Bob 1803b | 555-2564 1803c | 1803d | 1803e |
| 1802b | 2 | Lucky Demolition | | Turn off Gas & Water | 5/25/04 |
| | | John | 650-555-5493 | | |
| 1802c | 3 | Jimmie's Grading & Paving | | | |
| | | Jim | 705-555-2791 | | |
| 1802d | 4 | Rock Concrete Company | | | |
| | | Bill | 415-555-1347 | | |
| 1802e | 5 | Premium Construction Company | | Order Glue Lam Beam | 06/01/04 |
| | | Fred | 415-555-1681 | | |
| 1802f | 6 | Venture Heating and Sheet Metal | | Order AC & Heater | 06/01/04 |
| | | Barry | 510-555-4672 | | |
| | 15 | | | 1803 | |
| 1802g | 16 | Premium Construction Company | | | |
| | | Fred | 415-555-1681 | | |

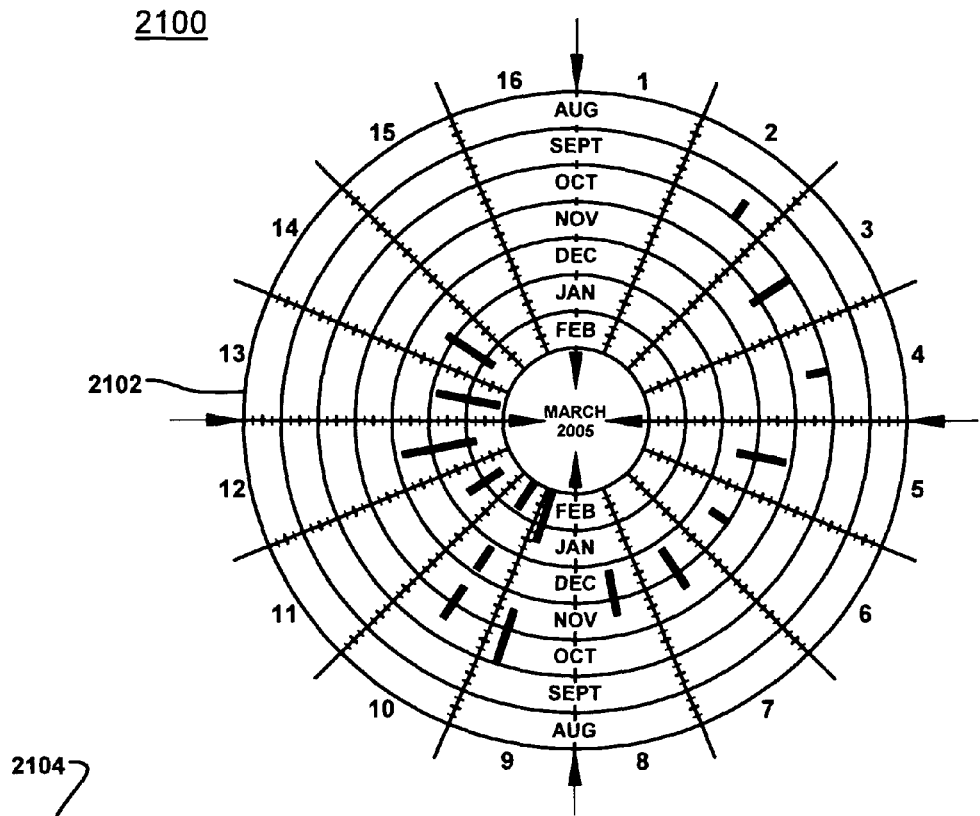

|   | VENDORS | CRITICAL TASK & DUE DATE | CONTACT | PHONE |
|---|---|---|---|---|
| 1 | Ace Surveyor | Set Property Line 09/01/04 | Phil Smith | 831-555-2553 |
| 2 | Ace House Moving | Remove House 09/15/04 | Mike Jones | 831-555-9874 |
| 3 | Albert Grading | | Peter Albert | 823-555-5632 |
| 4 | Benton Foundation | | Tom Benton | 852-555-5614 |
| 5 | Vucina Construction | Order Lumber 11/01/04 | Mark Vucina | 875-555-9856 |
| 6 | Smith Heating | | Fred Smith | 861-555-9654 |
| 7 | Hayward Windows | Order Windows 10/07/04 | Albert Brown | 861-555-6541 |
| 8 | Hayward Doors | Order Doors 10/07/04 | Joe Tucker | 861-555-2545 |
| 9 | Taylor Roofing | Roofing Colors 09/15/04 | Jim Taylor | 361-555-9874 |
| 10 | Byron Electrical | Electrical Fixtures 10/01/04 | Tony Byron | 831-555-8945 |
| 11 | Meyers Plumbing | Plumbing Fixtures 11/22/04 | Mark Myers | 831-555-7895 |
| 12 | Tricounty Installation | | Scott Marks | 831-555-1264 |
| 13 | Ace Drywall | Spray Texture 01/15/04 | Phil Brown | 549-555-7895 |
| 14 | Hayward Lumber | Order Material 10/15/04 | Mark Vucina | 825-555-8974 |

FIG. 21

|   | VENDORS | Critical Task & Due Date | CONTACT | PHONE |
|---|---|---|---|---|
| 1 | Ace Surveyor | Set Property Line 09/01/04 | Phil Smith | 831-555-2553 |
| 2 | Ace House Moving | Remove House 09/15/14 | Mike Jones | 831-555-9874 |
| 3 | Albert Grading |  | Peter Albert | 823-555-5632 |
| 4 | Benton Foundation |  | Tom Benton | 852-555-5614 |
| 5 | Vucina Construction | Order Lumber 11/01/04 | Mark Vucina | 875-555-9856 |
| 6 | Smith Heating |  | Fred Smith | 861-555-9654 |
| 7 | Hayward Windows | Order Windows 10/07/04 | Albert Brown | 861-555-6541 |
| 8 | Hayward Doors | Order Doors 10/07/04 | Joe Tucker | 861-555-5555 |
| 9 | Taylor Roofing | Roofing Colors 09/15/04 | Jim Taylor | 361-555-9874 |
| 10 | Byron Electrical | Electrical Fixtures 10/01/04 | Tony Byron | 256-555-6541 |
| 11 | Meyers Plumbing | Plumbing Fixtures 11/22/04 | Mark Myers | 861-555-8945 |
| 12 | Tricounty Installation |  | Scott Marks | 549-555-7895 |
| 13 | Ace Drywall | Spray Texture 01/15/04 | Phil Brown | 549-555-7895 |
| 14 | Hayward Lumber | Order Material 10/15/04 | Mark Vucina | 825-555-8974 |
| 15 | Johnson Painting | Painting Colors 01/01/05 | Eric Johnson | 256-555-1235 |
| 16 |  |  |  |  |
|  |  |  |  |  |

|   | TASK | DURATION | DUE DATE |
|---|---|---|---|
| 1 | Set Property Line | 1 Day | 09/01/04 |
|   |   |   |   |
| 2 | Remove House | 7 Days | 09/15/04 |
|   | Remove Old Foundation | 3 Days | 09/21/04 |
|   |   |   |   |
| 3 | Clear Site | 7 Days | 10/01/04 |
| 4 |   |   |   |
| 5 | Order Lumber |   | 11/01/04 |
|   |   |   |   |
| 6 |   |   |   |
| 7 | Order Windows | 1 Day | 10/07/04 |
|   | Install Windows | 2 Weeks | 02/10/05 |
|   |   |   |   |

FIG. 23

PROJECT MANAGEMENT SYSTEMS AND METHODS

CROSS REFERENCE TO RELATED APPLICATIONS

This invention claims the benefit of priority from U.S. Provisional Application No. 60/603,427, filed Aug. 20, 2004, entitled "Project Management Device and Method."

BACKGROUND

The present invention relates to a project management systems and methods, and in particular, to systems and methods that may be used for project planning, task management, time management, and other similar applications.

People typically expend a tremendous amount of time and energy organizing and tracking various undertakings such as projects or tasks. The need to manage projects and track related tasks has resulted in a number of solutions. One conventional solution involves using a linear calendar. Simple schedules may be digitized and automated in the form of a personal digital assistant, which automatically issues reminders and may be synchronized through a computer system with schedules of other individuals.

Other techniques used in project and task management include either bottom-up or top-down approaches. In bottom-up planning, all of the tasks required for a project are listed. Then, all the individual tasks may be compiled, categorized, coordinated and prioritized until the scheduling is complete. In top-down planning, goals are divided into major tasks, which are in turn continuously broken down into smaller tasks until the tasks are manageable. In either case, project and task management systems are useful in planning and managing the execution of tasks associated with a project.

At the complex end of the spectrum there exists many project and task management computer software systems. Such programs automate and assist the management of resources for various tasks and continually update the status of a project. For enhanced visual comprehension by the users, such programs often display the projects as timelines. Well-known examples include PERT charts and Gantt charts. Such display methods permit a project to be visualized.

A problem with such conventional solutions is that they show tasks spread out in a linear fashion. Presenting the tasks can take up many separate pages and can require a large physical area to visualize the whole project. For example, PERT and Gantt charts are linear, and if a project is long or complex, the project will span many pages, whether on a computer screen or on a printout. Accordingly, the conventional solutions are difficult or impossible for a user to comprehend the current status of a project at a glance, especially a long or complex project.

Furthermore, the conventional solutions typically have a "left to right" focus where the end date can be continuously extended as the project hits delays. However, many projects do not have the flexibility of allowing for changes in the end date. Contractors or product developers, for example, can lose money if they do not finish on time. Often, events such as weddings, conferences, and many other projects cannot be rescheduled without great difficulty, cost, or sacrifice.

Thus, there is a need for improved systems and methods for managing projects and tasks. The techniques should be simple, conceptually intuitive, efficient, and cost effective.

The present invention addresses such a need with innovative systems and methods that may be used to manage projects and tasks.

SUMMARY

Embodiments of the present invention provide improved project management systems and methods. In one embodiment the present invention includes a project management system comprising a plurality of radial task regions displayed around a focal point and a plurality of time regions displayed around the focal point, wherein each time region represents a period of time.

In one embodiment, the present invention further comprises a central region including the focal point. The focal point or a boundary of the central region may represent a point in time, such as a target project completion date, for example.

In another embodiment, the present invention further comprises one or more task identifiers, wherein at least one task region includes one or more task identifiers. Task regions or task identifiers may be associated with one or more tasks, projects, jobs, events, or goals. Task regions or task identifiers may be associated with information about one or more tasks. In one embodiment, task regions or task identifiers may be associated with at least one task description record. In one embodiment, each task description record comprises one or more task description fields.

Embodiments of the present invention are useful in managing projects that progress over a variety of different time periods. In one embodiment, time is represented as advancing inward toward the focal point. In another embodiment, time is represented as advancing outward away from the focal point. In some applications, the time period may be user definable. Each time region may represent an hour, a day, a week, a month, or any other time period deemed useful by a user.

In one embodiment, the project management system is implemented in software. In another embodiment, the project management system is implemented as a project management template printed on a sheet of material.

Embodiments of the present invention also include a project management system comprising a plurality of radial task boundaries, wherein a plurality of task regions are defined between adjacent task boundaries.

In one embodiment, the present invention includes a project management system comprising a plurality of task identifiers arranged radially around a focal point, wherein the focal point represents a point in time and each task identifier represents the progression of a task relative to the point in time.

In another embodiment, the present invention includes a project management template comprising a sheet of material displaying a chart having a plurality of radial task boundaries, wherein a task region defined between adjacent task boundaries corresponds to one or more tasks.

In yet another embodiment, the present invention includes a project management template comprising a sheet of material having a surface, an image on the surface, wherein the image comprises a chart having a plurality of concentric time regions, wherein each time region represents a time period.

In yet another embodiment, the present invention includes a project management method comprising displaying a plurality of radial task boundaries, wherein a plurality of task regions defined between adjacent task boundaries corresponds to one or more tasks.

In yet another embodiment, the present invention includes a project management method comprising displaying a plurality of task identifiers radially around a focal point, wherein the focal point represents a point in time and each task identifier represents the progression of a task relative to the point in time.

The following detailed description and accompanying drawings provide a better understanding of the nature and advantages of the present invention.

BRIEF DESCRIPTION OF THE DRAWINGS

FIG. 18 is an example of a description region portion of the project management template of FIG. 17 according to one embodiment of the present invention.

FIG. 21 is an example of a project management template according to one embodiment of the present invention.

FIG. 22 is an example of a description region portion of project management template according to one embodiment of the present invention.

FIG. 23 is an example of a description region portion of project management template according to one embodiment of the present invention.

DETAILED DESCRIPTION

Figure 1A:
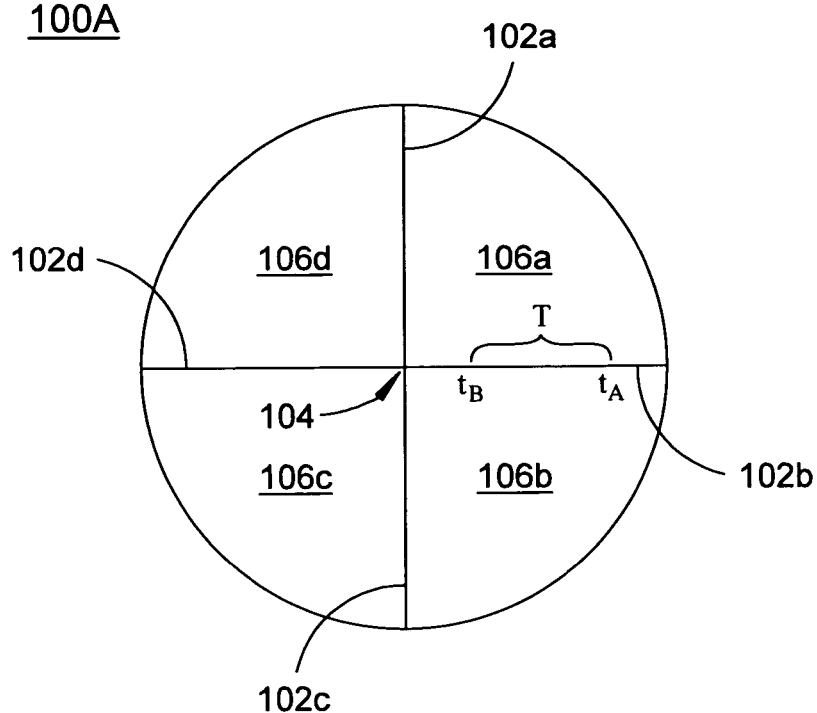
FIG. 1A illustrates a project management system according to one embodiment of the present invention.

Described herein are techniques for managing projects, tasks, jobs, events, goals, super-projects, sub-projects, and subtasks, for example. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

In one embodiment, the present invention includes a project management system, which may include, for example, a physical or electronic chart that divides a project into tasks. In one embodiment, the project is organized into task regions arranged radially around a focal point. The focal point is a point of convergence where the task regions would converge if extrapolated inward. In one embodiment, task regions are defined between radial task boundaries. The task regions may correspond to one or more tasks, and may be associated with information (i.e., data) about the tasks (herein, task information). Each of the tasks may be performed using independent resources. The task regions may be visually depicted as slices of the whole geometric shape. The focal point where all of the slices converge may represent a point in time, such as a project target completion date, target end date for a task or subtask, or the end date of a time region as described in more detail below. Alternatively, the point in time represented by the focal point may be represented by a boundary of a central region, such as a circle, that includes (e.g., is centered on) the focal point. This draws attention to the point in time represented by the focal point or central region boundary (e.g., a target completion date for a project) and shows this in an intuitive graph style.

Embodiments of the present invention may include project management systems implemented in software and displayed on a monitor or physical project management templates or charts that can be hung on a wall, for example. In one embodiment described in more detail below, the project management template may also include a description region into which task information can be entered. As a result, the project management template allows a user to view the whole project (i.e. macro view) and the details (i.e. micro view) of the tasks that constitute the project simultaneously in a simple, intuitive, visually meaningful, and compact, one-page presentation. In another embodiment, the project management system is implemented in software and the task information is stored and associated with tasks automatically in software. Project management systems and methods according to embodiments of the present invention may be stored as program instructions on a computer readable medium. The program instructions may be executed by a computer system and cause the computer system to execute the project management methods and techniques described herein.

FIG. 1A illustrates a project management system 100A according to one embodiment of the present invention. The system 100A includes task boundaries 102a, 102b, 102c, and 102d arranged radially around a focal point 104. In this example, task boundaries are lines representing time (i.e., timelines). In this case, each timeline 102a-d advances inward toward the focal point 104 such that a portion of a timeline (e.g., a portion, T, of timeline 102b) represents a period of time. In this example, a portion, T, of timeline 102b may represent some amount of time (e.g. an hour, a day, a week, a month, a year or any other user definable time period the user may find useful), where $t_A$ represents a point in time (e.g. Jan. 1, 2005) that occurs before $t_B$ (e.g. Feb. 13, 2005). It is to be understood that time may also be represented as advancing outward away from the focal point. Project management system 100A also includes task regions 106a, 106b, 106c, and 106d between the task boundaries 102a, 102b, 102c, and 102d. Adjacent task boundaries, such as boundaries 102b and 102c, may be used to define task regions, such as task region 106b, for example. Each task region 106a-d corresponds to a task, and the combined tasks 106a-d may correspond to a project or job, for example. While the task boundaries 102a-d are represented here as timelines, it is to be understood that other task boundaries may be used that are not continuous lines.

Project management system 100A may be used for scheduling, planning, and/or managing aspects of jobs, goals, projects, tasks, or other types of events. For example, the focal point may correspond to a target completion date for a job, goal, project, super-project, task, or subtask. Moreover, while the above description refers to each task region 106a-d as corresponding to a task, each region may correspond to one project in a plurality of projects relating to the completion of some larger project (e.g. super-project), goal, or job. Alternatively, each task region may correspond to a particular subtask in a plurality of subtasks relating to the completion of a task. The term task region as used herein is intended to mean the use of such regions to represent projects, super-projects, tasks, jobs, subtasks or other activities that relate to the completion of any desired goal. Embodiments of project management system 100A may also be referred to as a calendar, scheduler, planner, or time management system, for example.

Project management systems according to embodiments of the present invention can be implemented using software where a user enters task information such as time increment data, target dates, resource information, and other information about each task. Examples of task information include any of a variety of task details such as information about vendors, due dates, short term objectives, daily logs, subcontractors, weather, incidents, accidents, issues, and problems. Other examples are provided below. The system may display task boundaries and task regions for viewing by a user, or can alternatively print out the information to allow a user or multiple project members to view a hard copy. As a given project progresses, the data can be readily updated, re-displayed and printed out.

Alternatively, in another embodiment of the present invention, the project management system 100A can be provided as a blank project management template onto which a user manually writes task information. Examples of such a blank project management template are described in greater detail below.

Figure 1B:
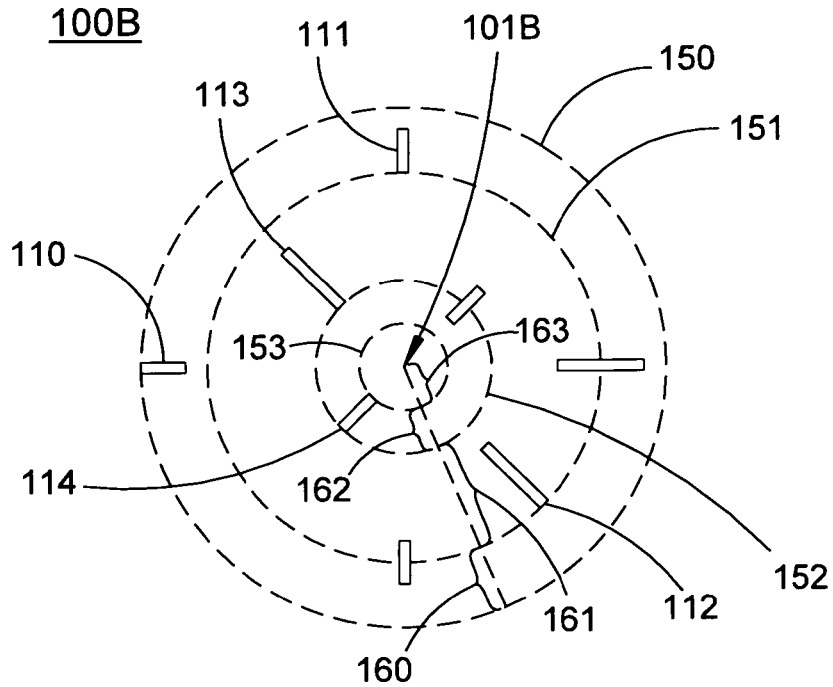
FIG. 1B illustrates a project management system according to another embodiment of the present invention.

FIG. 1B illustrates a project management system 100B according to another embodiment of the present invention. Project management system 100B includes a plurality of concentric time boundaries 150-153 that define concentric time regions 160-163. As used herein, concentric means having a common center or center point. The common center may be a focal point or a central region, and in either case may represent a point in time. One example of concentric time regions are the bands created by the circles in FIG. 1B that each have a different radius. However, time regions need not be circular. A variety of geometric shape may be used. In a specific embodiment, each time region 160-163 is a band that completely wraps around the focal point 101B. Time regions 160-163 represent periods of time, which may be the same for each region or different across different regions. These time periods may be user definable or predetermined. Time regions 160-163 may represent any desired time period, such as an hour, a day, a week, a month, a year or any other period the user may find useful. An instant in time represented as a concentric shape (e.g., a circle) is referred to as a "time-ring", wherein the distance from the focal point to the time-ring's perimeter represents the amount of time between the "time-ring" and the point in time represented by the focal point (e.g., target completion date). Project management system 100B includes an outer boundary defined by the outermost time boundary 150. Outer boundary 150 also represents a point in time. Thus, the total time displayed is the difference between the point in time represented by the outer boundary and the point in time represented by the focal point. In one embodiment, time progresses linearly across time regions. However, in another embodiment, time may progress non-linearly across time regions.

Project management system 100B also includes a plurality of task identifiers, such as task identifiers 110-113. Task identifiers 110-113 are markings that represent the temporal progression of a task (i.e., a representation of the beginning, duration, and end of a task). Task identifiers may be associated with task information. For example, each identifier may include numbers positioned proximate to each task identifier that are associated with similarly number tasks in a description region, or the association may be implemented in software. The task identifiers may be displayed within the outer boundary and arranged radially around a focal point. Each task identifier corresponds to one or more tasks and represents the progression of such task(s) over time. For example, as mentioned above, the focal point represents a point in time, and time boundaries 150-153 represent points in time relative to the focal point. If time increases inward toward the focal point, the points in time represented by time boundaries 150-153 represent earlier points in time. Task identifier 110 starts at the point in time represented by outer time boundary 150 and ends at some later point in time. Thus, the task corresponding to task identifier 110 (e.g., laying cement for a foundation or conducting market research for a new product) is the first scheduled task and begins at the time corresponding to time boundary 150. Similarly, a second task corresponding to task identifier 111 starts sometime after the point in time represented by outer boundary 150 and ends at a point in time represented by time boundary 151. Task identifier 112 starts at time boundary 151 and ends prior to time boundary 152. Task identifier 113 ends at time boundary 152. Task identifier 114 starts at time boundary 152 and ends at time boundary 153. Thus, each task identifier represents the progression of a task relative to the point in time represented by the focal point. Task identifiers may be represented in a variety of ways, such as lines, bars, or as sequences of fanciful icons. For the remainder of this description, the term "task bar" shall be used for task identifiers. However, it is to be understood that a variety of other task identifiers could be used in the examples below. Moreover, it is to be understood that additional time boundaries may be used to improve resolution of the time scale.

Figure 2A:
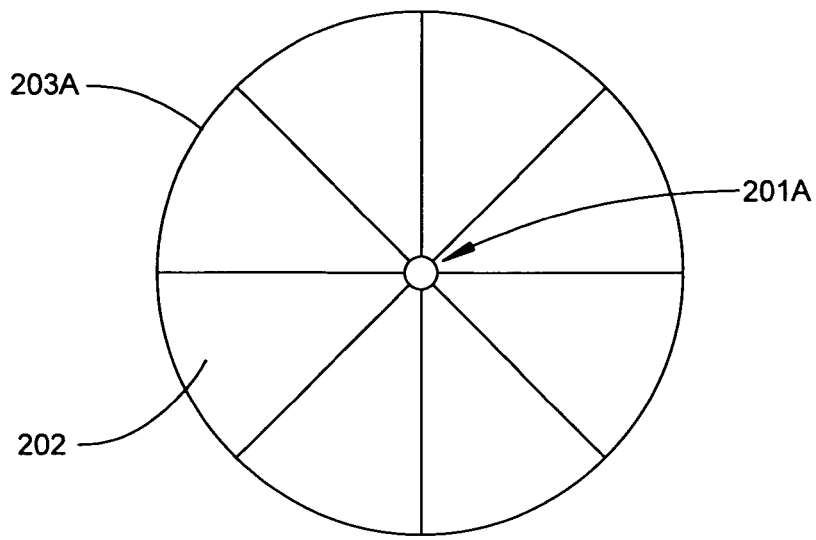
FIG. 2A illustrates a project management system including a central region according to one embodiment of the present invention.

FIG. 2A illustrates a project management system 200A including a central region according to one embodiment of the present invention. In a specific embodiment, a central region 201A is provided where the central region may, but not necessarily, be centered on the focal point. In FIG. 2A, the central region 201A is represented by a circle. However, a variety of geometric shapes could be used. As with the focal point, central region 201A includes a boundary that represents a point in time, such as a target completion date for a job, project, event, task, or sub-task, for example. The boundary of the central region may be the perimeter of the circle or boundary of any other geometric shape. Project management system 200A further includes an outer time boundary 203A that also represents a point in time. In one embodiment, the outer time boundary 203A represents an earlier point in time than the central region boundary. Thus, time is represented as advancing inward toward the focal point or central region time. In another embodiment, the outer time boundary 203A represents a later point in time than the central region or focal point. Thus, time is represented as advancing outward away from the focal point or central region time.

Figure 2B:
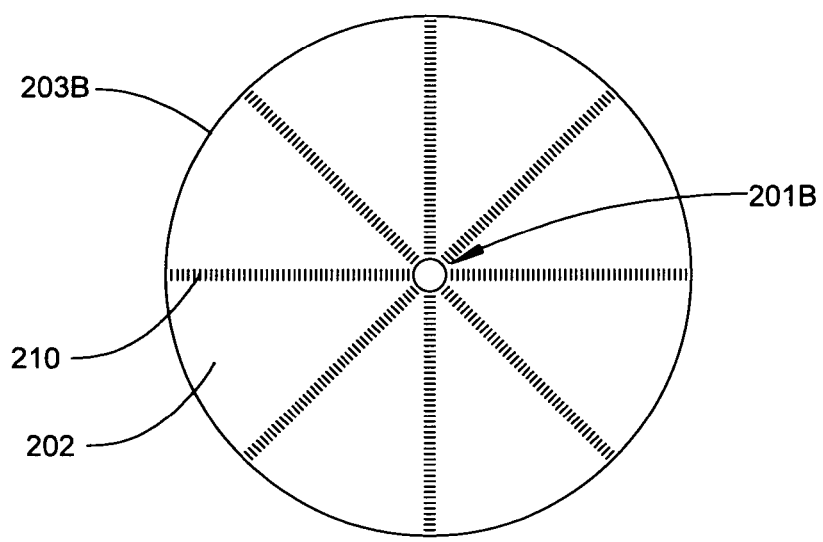
FIG. 2B illustrates a project management system according to another embodiment of the present invention.

FIG. 2B illustrates a project management system 200B according to another embodiment of the present invention. Project management system 200B includes task regions (e.g., task region 202) defined between a plurality of radial task boundaries 210. As mentioned above, task boundaries 210 may not be continuous lines (e.g., timelines). In this example, the task boundaries are defined by radial "hash marks" between an outer time boundary 203B and a central region 201B. The central region boundary may represent a point in time later than a point in time represented by outer boundary 203B, and the hash marks may serve the dual role of demarcating task regions and illustrating the progression of time. For example, the distance between each hash mark may represent a period of time such as a minute, an hour, a day, a month, or a year. Any number of hash marks sufficient to create an impression of a boundary may be used.

Figure 3:
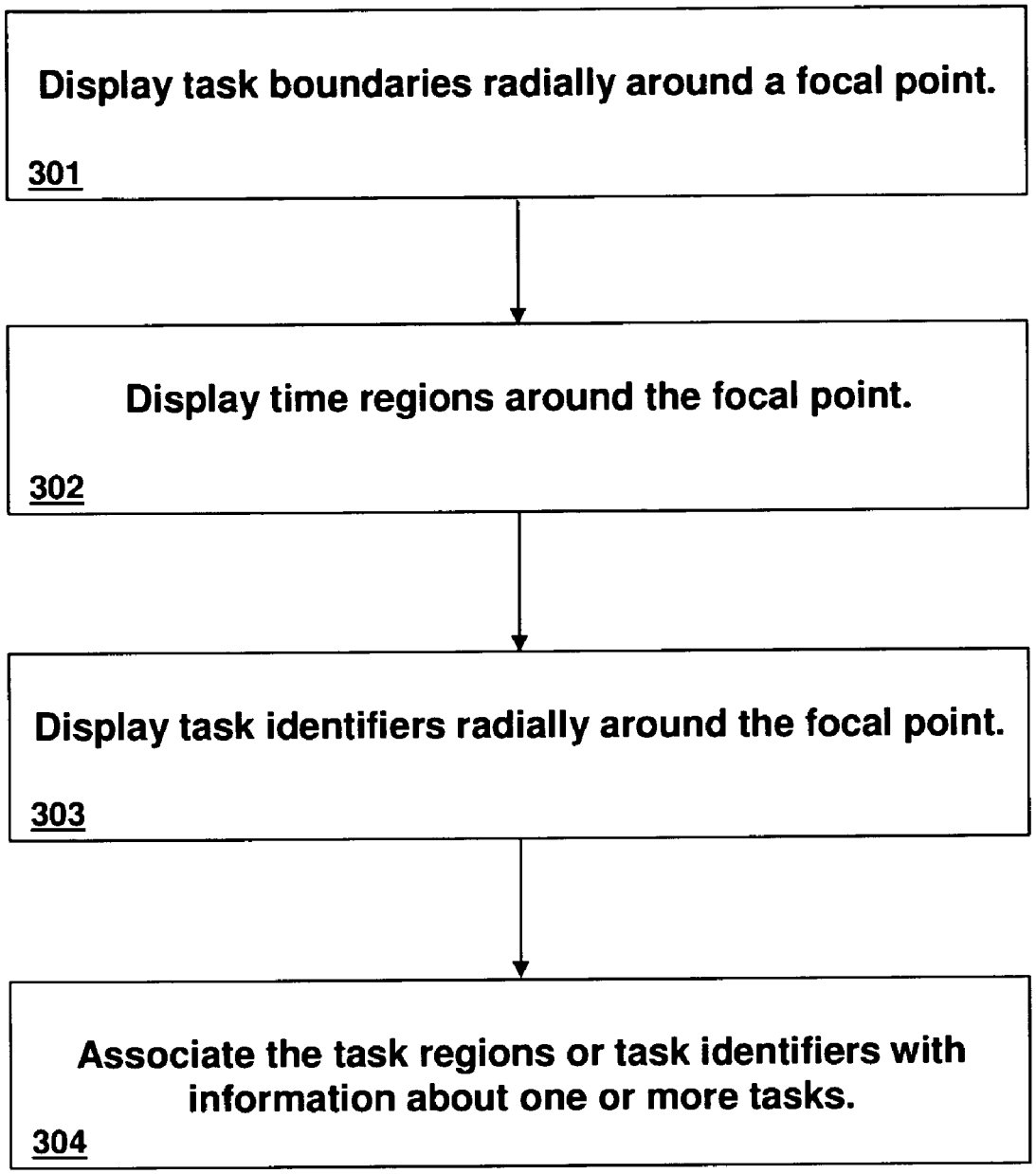
FIG. 3 illustrates a project management method according to one embodiment of the present invention.

FIG. 3 illustrates a project management method according to one embodiment of the present invention. The method of FIG. 3 combines aspects of the present invention presented in FIGS. 1A-B and 2A-B. It is to be understood that other embodiments may not include all the steps in the following method. At 301, the task boundaries are displayed radially around the focal point. The task boundaries may be radial timelines or hash marks, for example (e.g., increasing inward toward the focal point or outward away from the focal point). Adjacent task boundaries may define task regions. At 302, time regions are displayed around the focal point. At 303, task identifiers may be displayed radially around the focal point. Task identifiers may represent the progression of a task over time. At 304, the task regions or task identifiers may each be associated with information about one or more tasks.

Figure 4A:
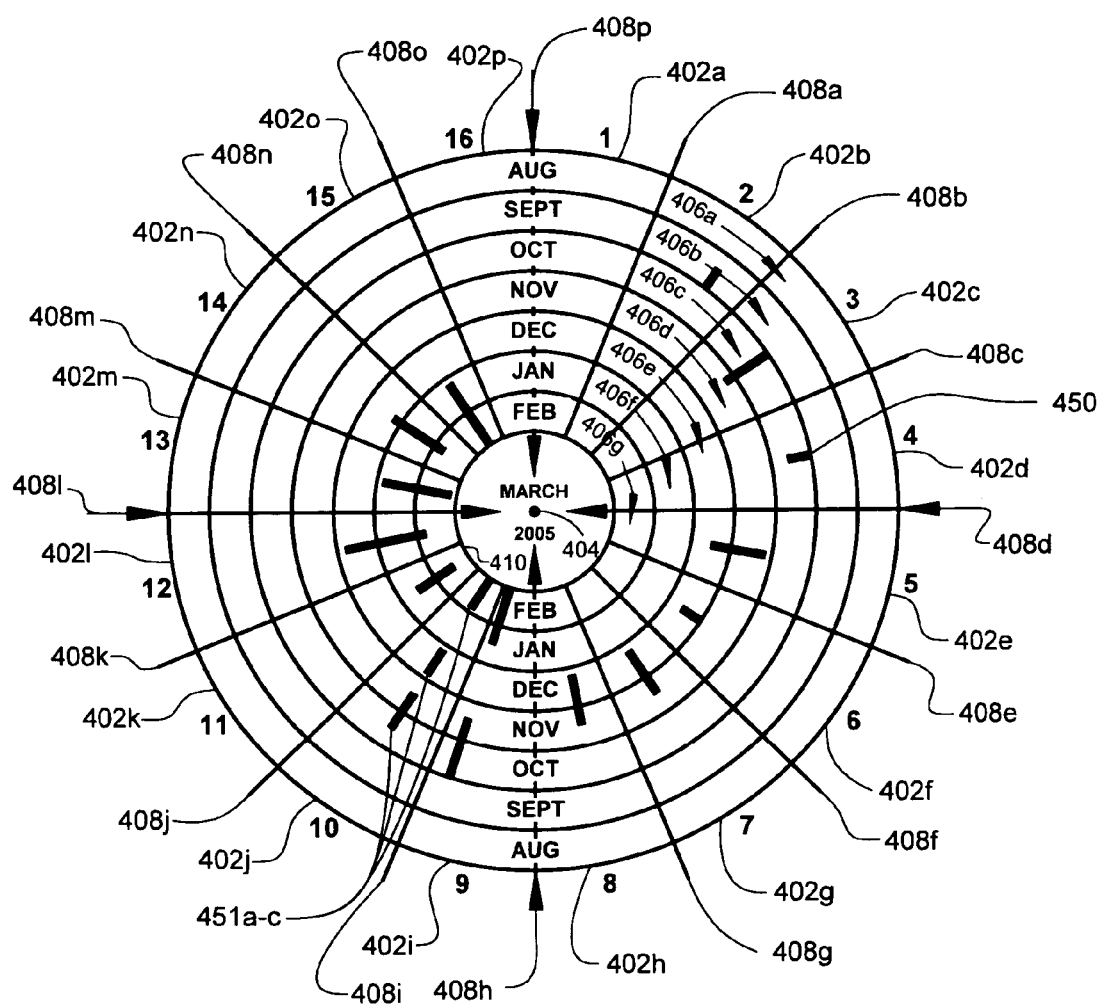
FIG. 4A is an example of a project management system according to one embodiment of the present invention.

FIG. 4A is an example of a project management system according to one embodiment of the present invention. The project management system 400A includes task regions 402a-p arranged radially around a focal point 404, and further includes time regions 406a-g arranged concentrically around the focal point 404. Project management system 400A also includes axes 408a-p arranged radially around the focal point 404 that act as task boundaries. In this example, each axis 408a-p is a timeline representing the progression of time toward the target date. In a specific embodiment, project management system 400A also includes a central region 410 centered on the focal point 404. The central region may be used for displaying information about the project, job, or goal such as the target date of completion.

The task regions 402a-p overlap the time regions 406a-g such that each time region 406a-g includes portions of different task regions 402a-p. Also, the task regions 402a-p overlap the time regions 406a-g such that each task region 402a-p includes portions of the different time regions 406a-g. Overlapping task regions and time regions allow users to compare and analyze the temporal relationship between multiple tasks for a project simultaneously.

In accordance with one embodiment of the present invention, each task region 402a-p may be associated with one or more tasks of a plurality of tasks that constitute a project. As described above, the central region 410 may represent a target completion date for the project represented by the plurality of task regions, and the time regions 406a-g advance inward toward the focal point 404 or central region 410. Thus, in this example each task region progresses inward toward the target completion date. Embodiments of the present invention may allow a user of the project management system to associate one or more task regions 402a-p with a particular resource.

In this example, task regions may include one or more task identifiers 450-451. Task identifiers (here, task bars) represent the progression of a task relative to the point in time represented by the focal point or central region boundary. For example, the progression of task "4" in task region 402d is represented by task identifier 450, which begins at the beginning of October (end of September) and ends about half-way through October. Similarly, the progression of task "10" in task region 402j is represented by task identifiers 451a, 451b, and 451c. Multiple task identifiers may indicate that different stages of a task are completed at different times or that different sub-tasks associated with task region "10" (or associated with task identifier 451a-c) are completed at different times. Task "10" may have a first stage that begins in the middle of October, for example, and ends in the middle of November. A second stage may begin in early December and end in late December. Finally, the last stage may begin in early February and end at the beginning of March, which is the target completion date for the whole project. Other embodiments of task identifiers are described in more detail below.

Figure 4B:
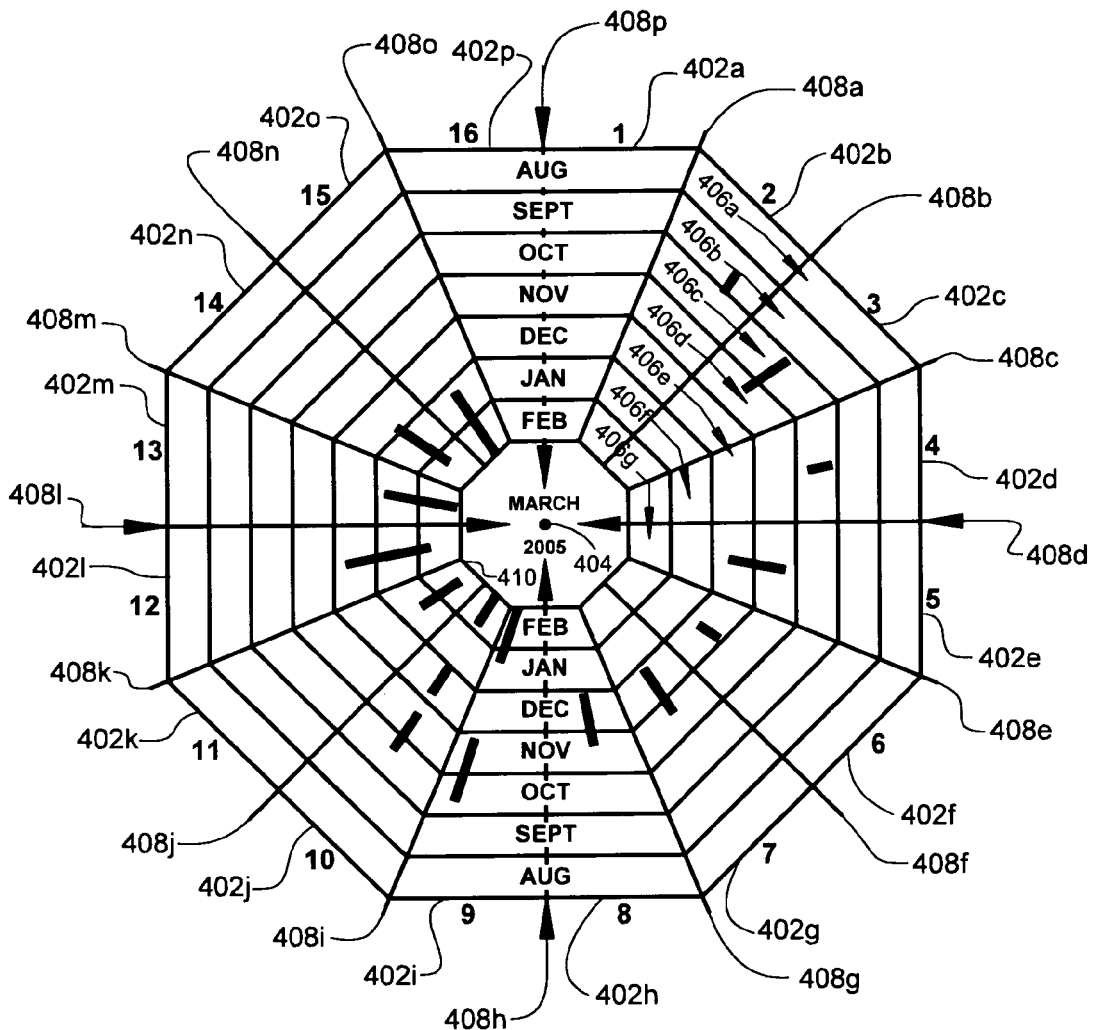
FIG. 4B is an example of a project management system according to another embodiment of the present invention.

As shown in FIG. 4A, each task region 402a-p appears as a slice or wedge, each time region 406a-g appears as a concentric circle, and the central region 410 appears as a circle. One of ordinary skill in the art will readily recognize that the task regions 402a-p, the time regions 406a-g, and the central region 410 could be implemented using a variety of other geometric shapes and still be within the spirit and scope of the present invention. FIG. 4B is a diagram of a project management system 400B in accordance with another embodiment of the present invention using an octagon as an alternative geometric shape.

Figure 4C:
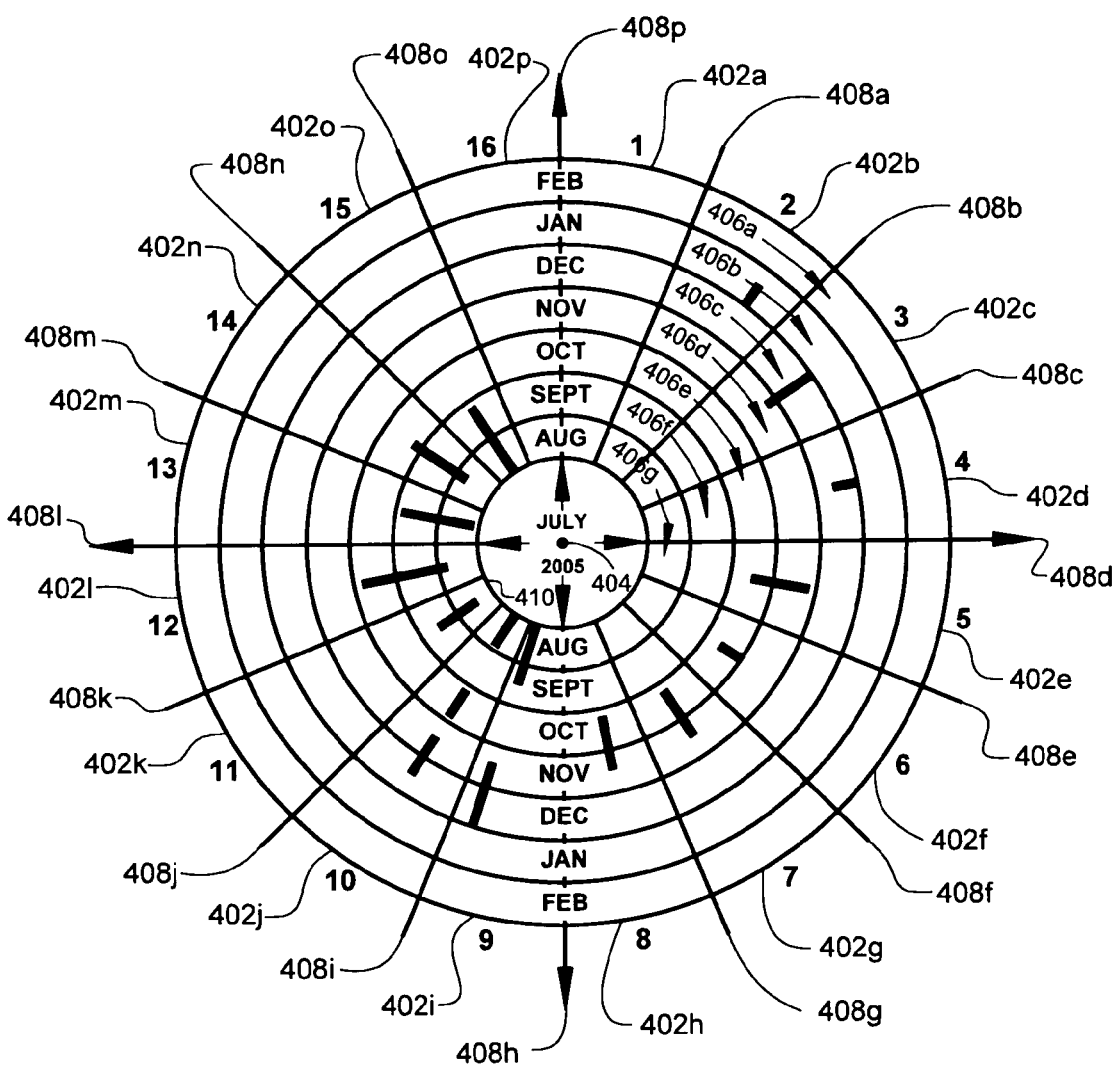
FIG. 4C is an example of a project management system according to another embodiment of the present invention.

Embodiments of the present invention allow a user to view a plurality of tasks associated with task regions and obtain an indication of critical elements for the project on a single, easily comprehensible page. This results in a display that is both easy to understand and simple to update. One implementation is shown in FIG. 4A, where the display is arranged in an "inward" manner with the target date occupying the central region 410. An "inward" manner means that a user reads from earlier in time to later in time by reading from the outer part of the chart (e.g., the outermost circle) to the inner part of the chart (e.g., the innermost circle). In accordance with one embodiment of the present invention, individuals may associate a target completion date (e.g., a project end date) with the central region 410. An alternative implementation is shown in FIG. 4C where the display is arranged in an "outward" manner with the start date occupying the central region 410. An "outward" manner means that a user reads from earlier in time to later in time by reading from the inner part of the chart (e.g., the innermost circle) to the outer part of the chart (e.g., the outermost circle). Thus, in accordance with another embodiment of the present invention, individuals may associate a start date with the central region 410.

As shown in FIG. 4A, with the "inward" format the target date may be entered into the central region 410. In this example, the circular display includes a plurality of concentric circles, each of which denotes a particular increment of time. Each concentric circle represents the boundary between two months (i.e. each circle marks the beginning of a month) and the difference in the radii of adjacent circles is a linear representation of one month. Similarly, the concentric circles could represent hours, days, weeks, years or any increment of time relevant to the project being displayed. In the inward display, time moves forward (as indicated by arrows pointing toward the focal point 404) towards the central region 410 of the display so that a larger circle is earlier in time that a smaller circle.

Figure 5:
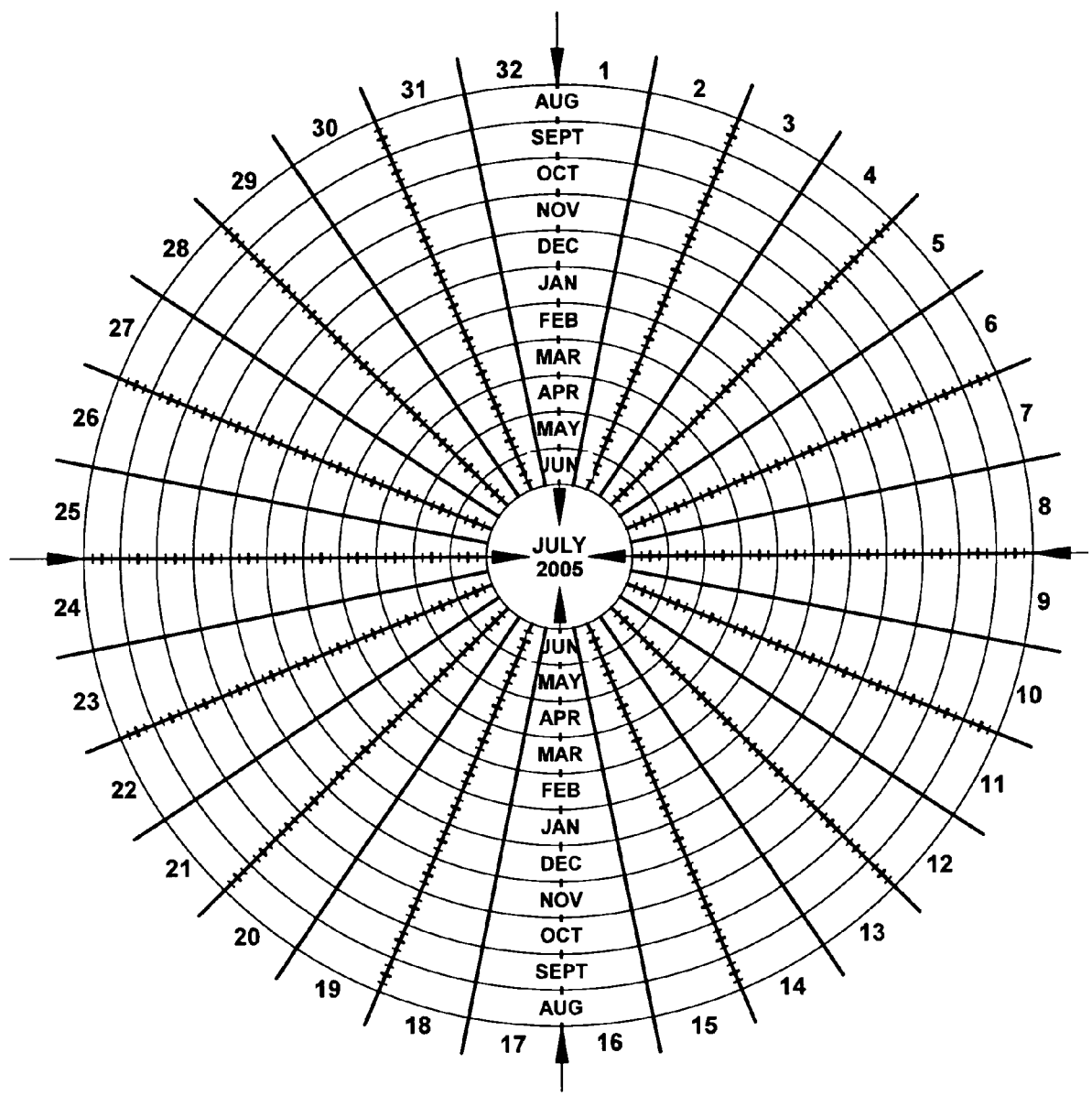
FIG. 5 is an example of a project management system according to another embodiment of the present invention.

The specific number of task regions 402*a-p* will depend on the specific application. One of ordinary skill in the art will readily recognize that there could be any number of task regions 402*a-p* depending on the number of tasks that may be associated with a particular project. For example, FIG. 5 is a diagram of a calendar 500 having 32 task regions in accordance with another embodiment of the present invention.

Figure 6:
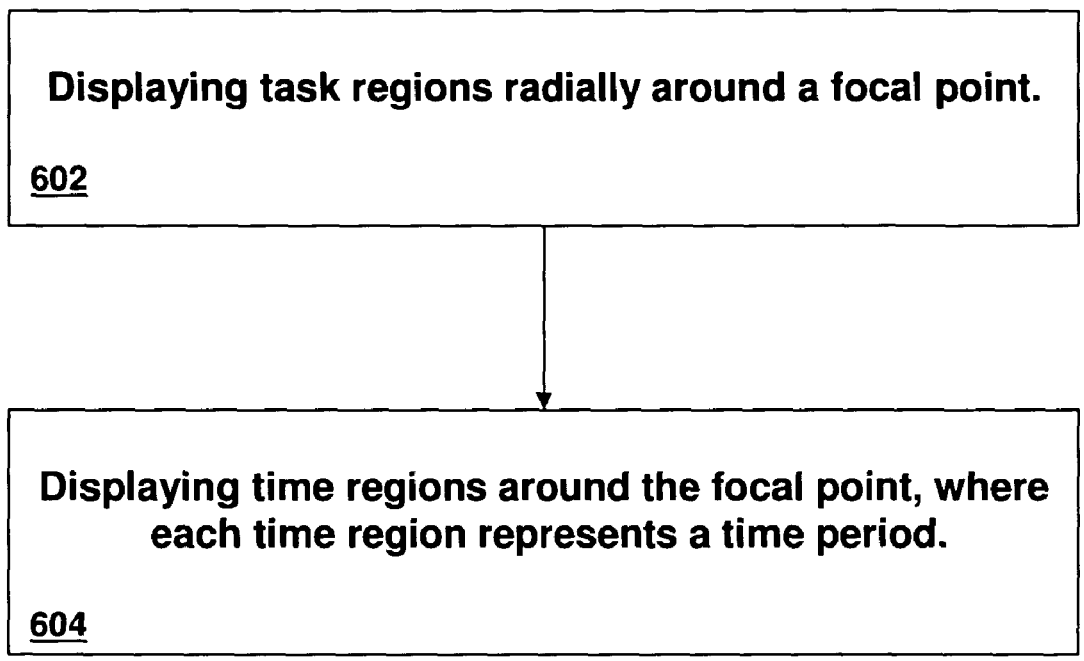
FIG. 6 illustrates a method according to one embodiment of the present invention.

FIG. 6 illustrates a method according to one embodiment of the present invention. At 602 task regions (e.g., regions 402*a-p* in FIG. 4A) are displayed radially around the focal point. At 604, time regions (e.g. 406*a-g* in FIG. 4A) are displayed concentrically around the focal point, where each time region represents a period of time. In a specific embodiment, the central region 410 is provided where the central region 410 is centered on the focal point 404. The central region 410 may represent a target completion date or time.

Figure 7:
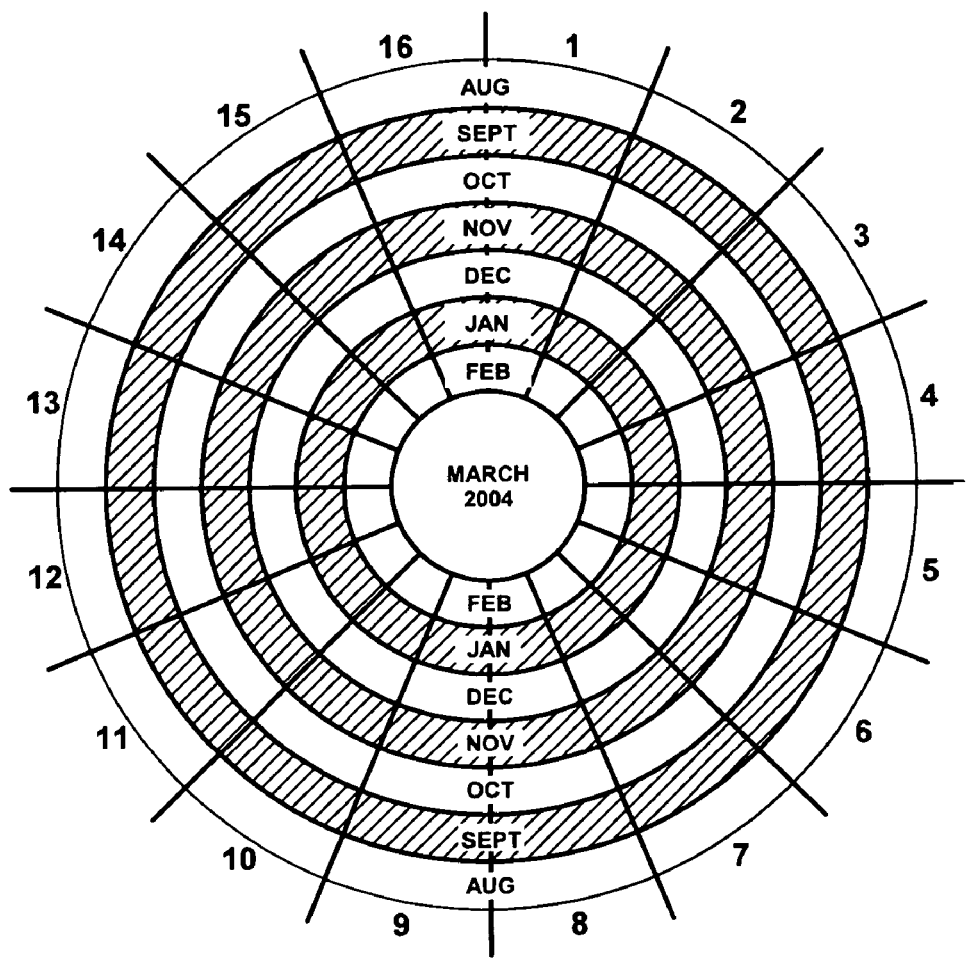
FIG. 7 is an example of a project management system according to another embodiment of the present invention.

FIG. 7 is an example of a project management system according to another embodiment of the present invention. In FIG. 7, alternating time intervals are shaded with different colors to provide visual distinction or denotation of a given period of time. It is to be understood that a variety of colors or patterns could be used to distinguish the different time regions.

Figure 8:
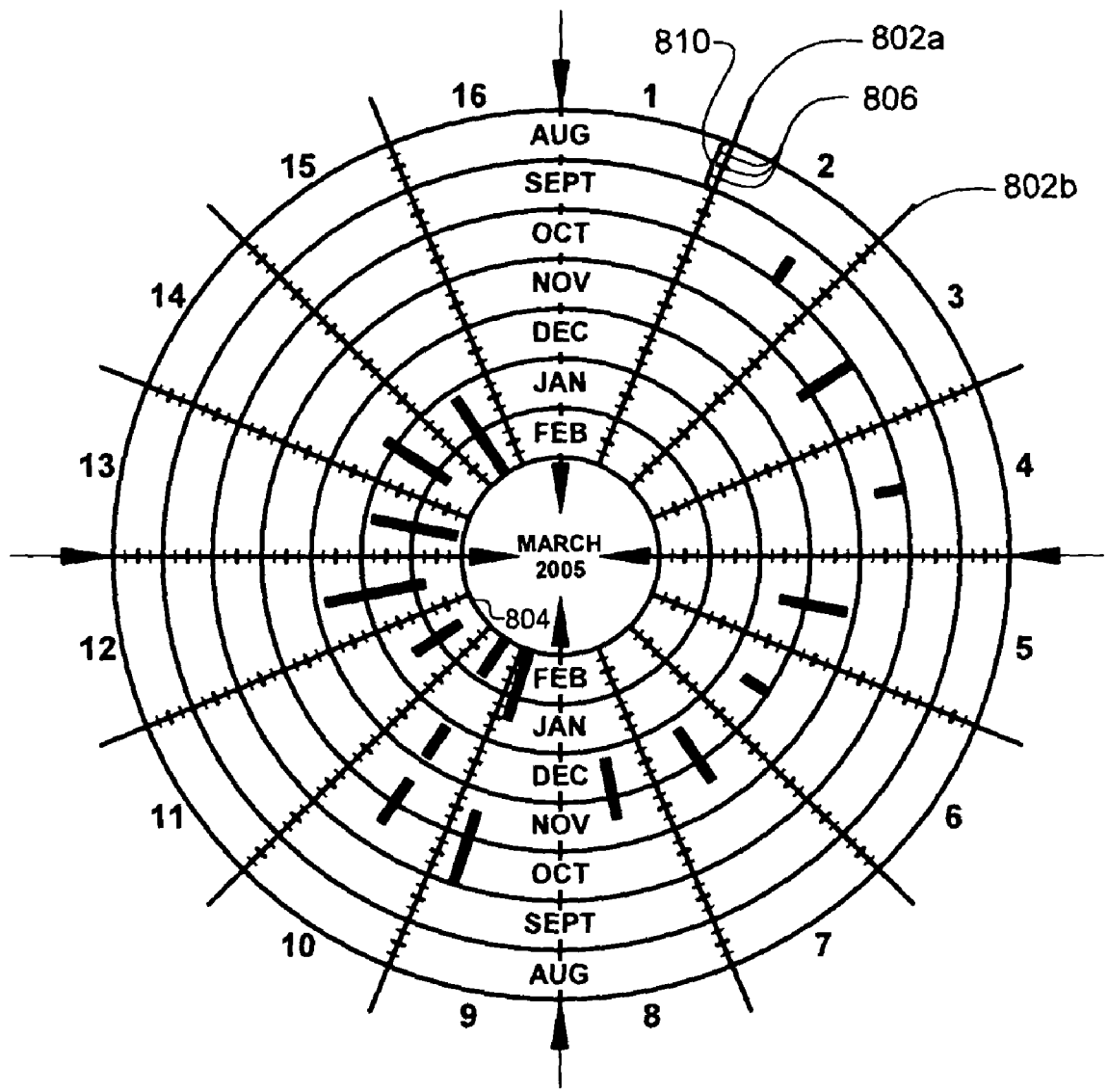
FIG. 8 is an example of a project management system according to another embodiment of the present invention.

FIG. 8 is an example of a project management system according to another embodiment of the present invention. FIG. 8 includes timelines 802*a* and 802*b* with hash marks (also referred to as "tick" marks) in accordance with another embodiment of the present invention. For simplicity, only two of the timelines 802*a* and 802*b* are numbered. In this example, each timeline 802*a* and 802*b* advances inward toward the central region 804, and each timeline 802*a* and 802*b* includes a series of tick marks 806 that assist in identifying time intervals more accurately within a time region 810.

Since the time region 810 between two adjacent concentric circles represents one month in the example of FIG. 8, the radius segments intersecting each time region may be subdivided by a series of tick marks 806 so that the distance between adjacent tick marks represents one week (i.e. four weeks of the month). Because months do not necessarily precisely begin or end on the borders between calendar weeks, the symbolism of the display can be taken to represent the first, second, third and fourth weeks of a month. Tick marks may be similarly used to represent any desired time period.

The width of each time region can depict any amount of time. Typically, a time region would signify an hour, day, week, or month. Time regions can also signify one or more years, one or more quarters, typical work weeks (5 days), random work weeks (any days of choice), weekends, one day per week, one week per month, hours, half of a day, 12 hours of a day, 8 hours per day, 4 hours per day, a certain number of minutes, etc. Time regions can also be used to depict periods that are not based on these standard times. For example, a delay that affects all tasks (e.g., a weather delay) may be represented as a time region. Such a "weather delay time region" might be applied to the whole chart and may have a time of 10 days rather than a standard week. The time regions are typically sized equally in the chart to signify equal time periods across the project. Alternatively, varying time periods may be depicted visually by adjusting the width of different time regions automatically by computer or manually.

Figure 9A:
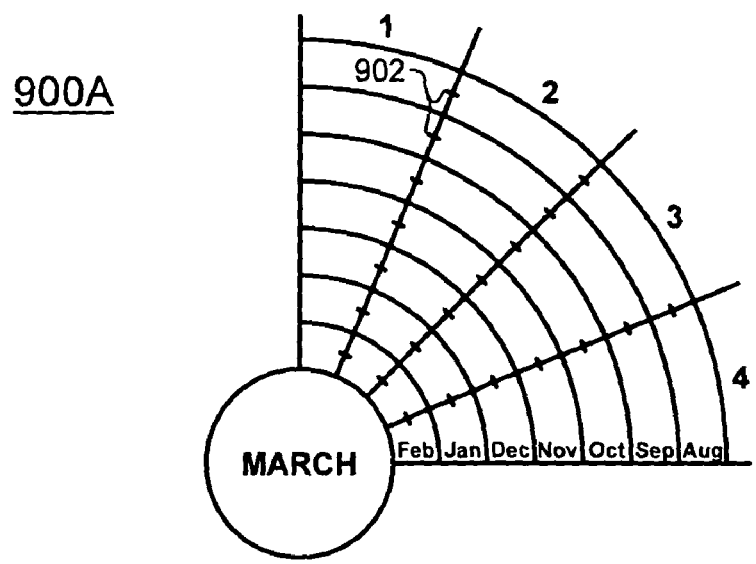
FIGS. 9A-C are examples of project management systems according to other embodiments of the present invention.
Figure 9B:
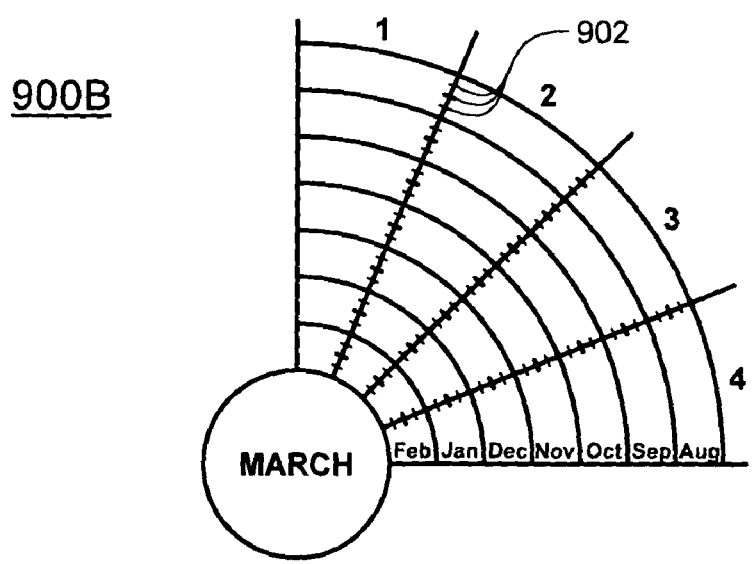
Figure 9C:
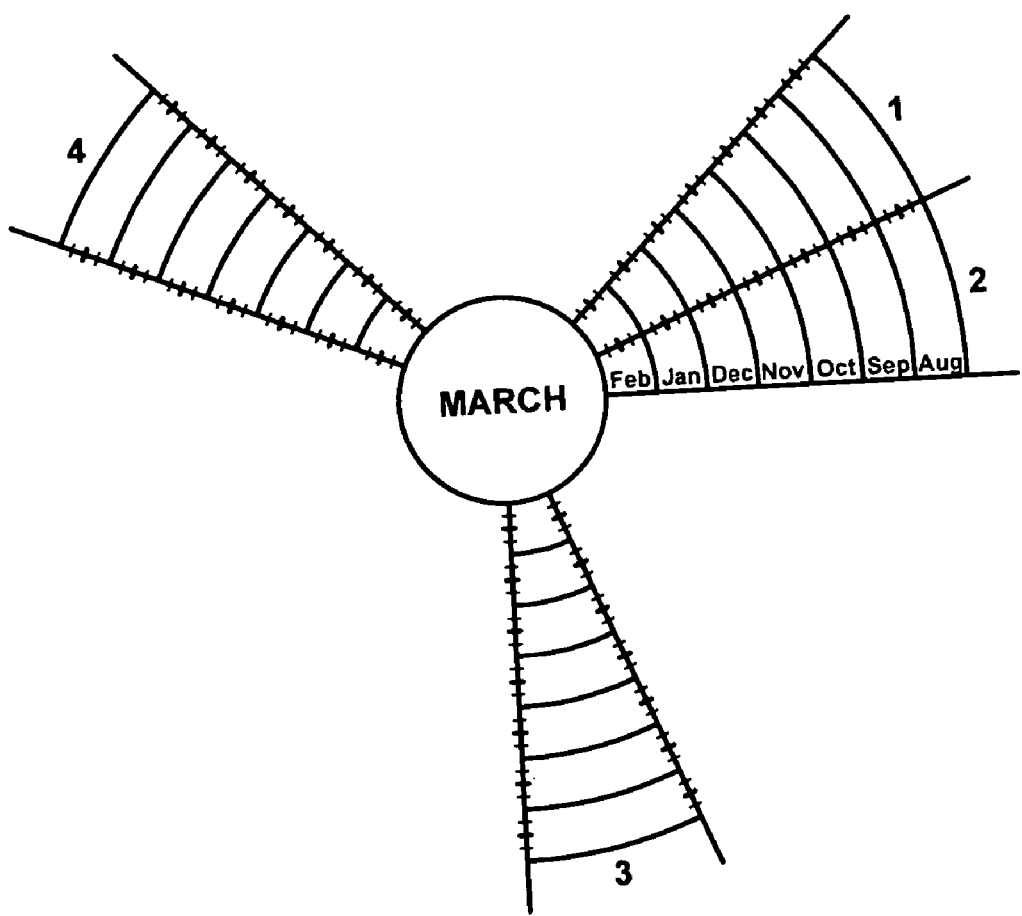

FIGS. 9A-C are examples of project management systems according to other embodiments of the present invention. FIG. 9A shows a monthly time scale where the tick marks 902 demarcate two-week time periods. FIG. 9B shows a project management system 900B with a monthly time scale where the tick marks 902 demarcate one-week time periods, in accordance with the present invention. Alternatively, the tick marks may demarcate other time periods such as days. The examples shown in FIGS. 9A and 9B show only four task regions. It will be apparent that any number of task regions can be displayed, and that the task regions displayed are not necessarily contiguous (in terms of the full display). FIG. 9C shows a project management system 900C where the task regions are not displayed contiguously.

In accordance with one embodiment of the present invention, multiple project management charts may be used to move between different projects in a project hierarchy or alternatively between different tasks in a task hierarchy. As such, multiple sub-charts may be used with a master chart to show more detail of any aspect of the project than is possible or desirable on the master chart. For example, each sub-chart may show scheduled tasks for a particular resource. A sub-chart may be used to evaluate the effectiveness of a particular resource for future reference. Alternatively, a master chart may include 12 time regions that are each one-month long, and multiple sub-charts may include 4 time regions that are each one-week long. Also, a sub-chart may be used to create a daily work record and an archive for the project.

Figure 10A:
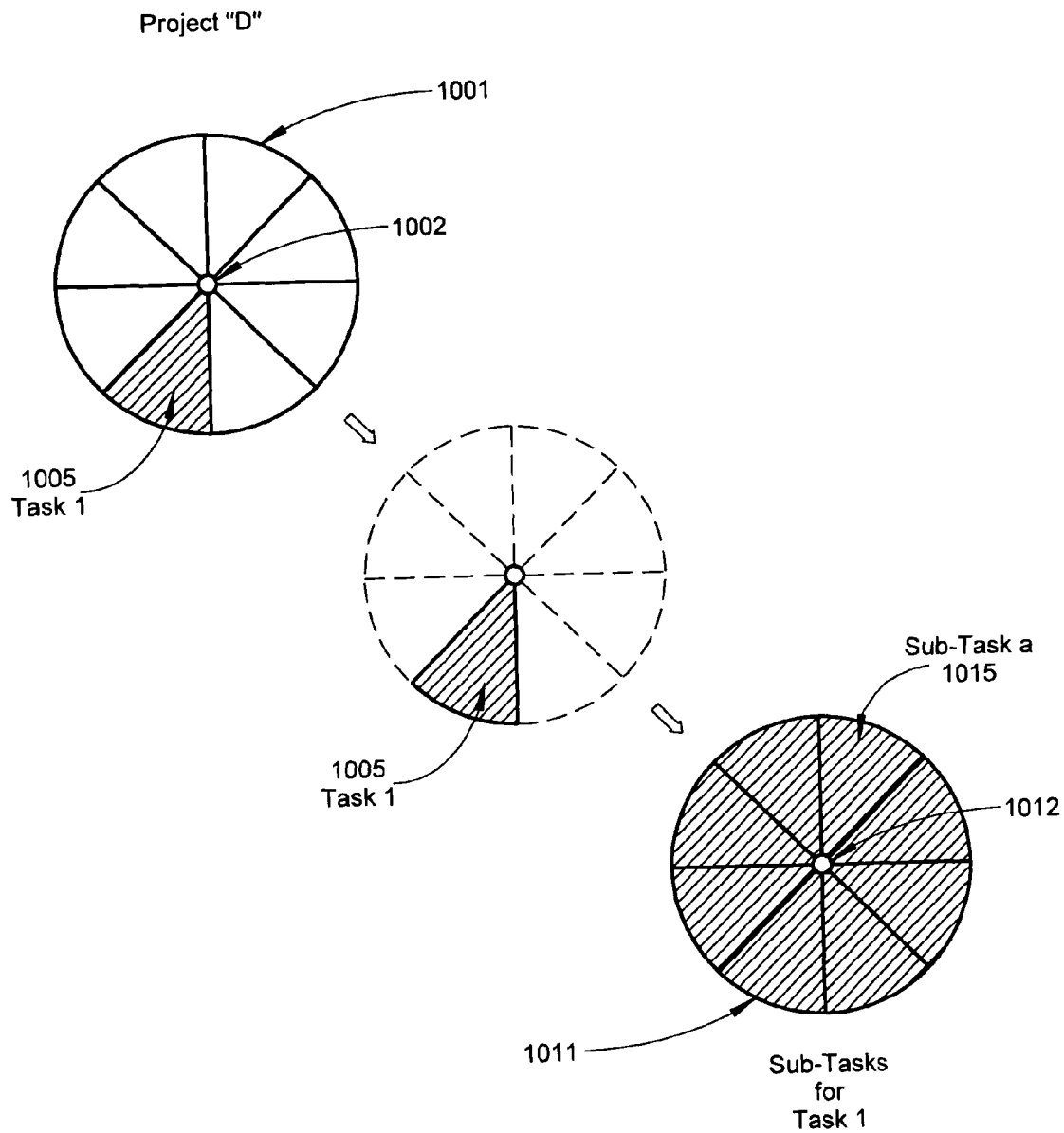
FIG. 10A is an example of a hierarchical relationship between projects and tasks according to one embodiment of the present invention.

FIG. 10A is an example of a hierarchical relationship between projects and tasks according to one embodiment of the present invention. In this example, a user may move back and forth between tasks to subtasks in a hierarchical manner. For example, FIG. 10A shows a plurality of task regions 1001 corresponding to the tasks required to complete project "D". The tasks are arranged radially around a focal point that represents a target completion date of the project. In this case the focal point is included in the central region 1002. In some cases, each task may be associated with a plurality of subtasks. For example, a task associated with task region 1005

(e.g., Task 1) may include a plurality of sub-tasks (e.g., "sub-task a" 1015). These sub-tasks may, in turn, be associated with task regions 1011 of another chart displaying some or all of the sub-tasks for task 1005. The central region 1012 may represent the target completion date of a task (e.g., Task 1) associated with task region 1005. Thus, embodiments of the present invention may be used to manage tasks across multiple levels.

Figure 10B:
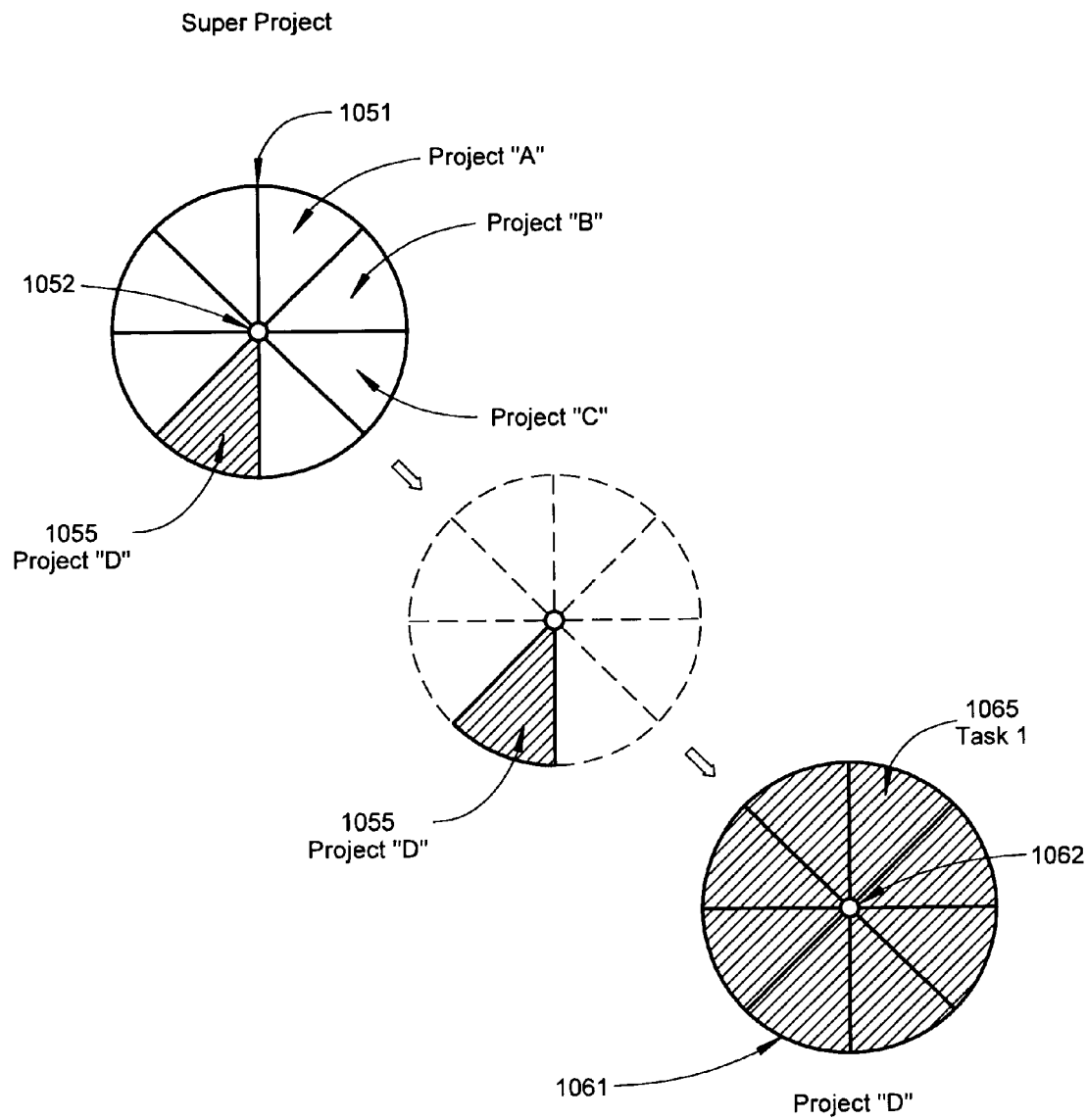
FIG. 10B is an example of a hierarchical relationship between super-projects and projects according to one embodiment of the present invention.

FIG. 10B is an example of a hierarchical relationship between super-projects and projects according to one embodiment of the present invention. In this example, a user may move back and forth between a super-project to a project in a hierarchical manner. For example, FIG. 10B shows a plurality of task regions 1051 corresponding to the projects required to complete a particular super-project. The task regions 1051 corresponding to the projects are arranged radially around a focal point that represents a target completion date of the super-project. In this case the focal point is included in the central region 1052. In some cases, each project may be associated with a plurality of tasks (e.g., "Task 1" 1065). These tasks may, in turn, be associated with task regions 1061. The central region 1062 may represent the completion of the project "D". Thus, embodiments of the present invention may be used to manage projects across multiple levels.

As mentioned above, embodiments of the present invention may be implemented in software on a computer and displayed to a user on a monitor or other type of display. From FIGS. 10A and 10B it can be seen that a user may move between any task regions to associated sub-task regions with a simple mouse click, for example. It can also be seen that groups of task regions may represent super-projects, projects, tasks, or sub-tasks across many hierarchical levels and users may easily move between levels to easily obtain any desired information. In one embodiment, a user may be able to move across hierarchies for multiple task regions simultaneously. For example, if multiple task regions are related, a user may want to zoom in on all the regions together. This "zoom in" and "zoom-out" function can be performed on any number of tasks together based on the user's need such as dependencies, completion dates, status, etc. If the project management system is implemented physically, such as a project management template described in more detail below, a user may use project management templates to track super-projects, projects, tasks, sub-tasks or any number of additional hierarchical levels needed or desired.

Figure 10C:
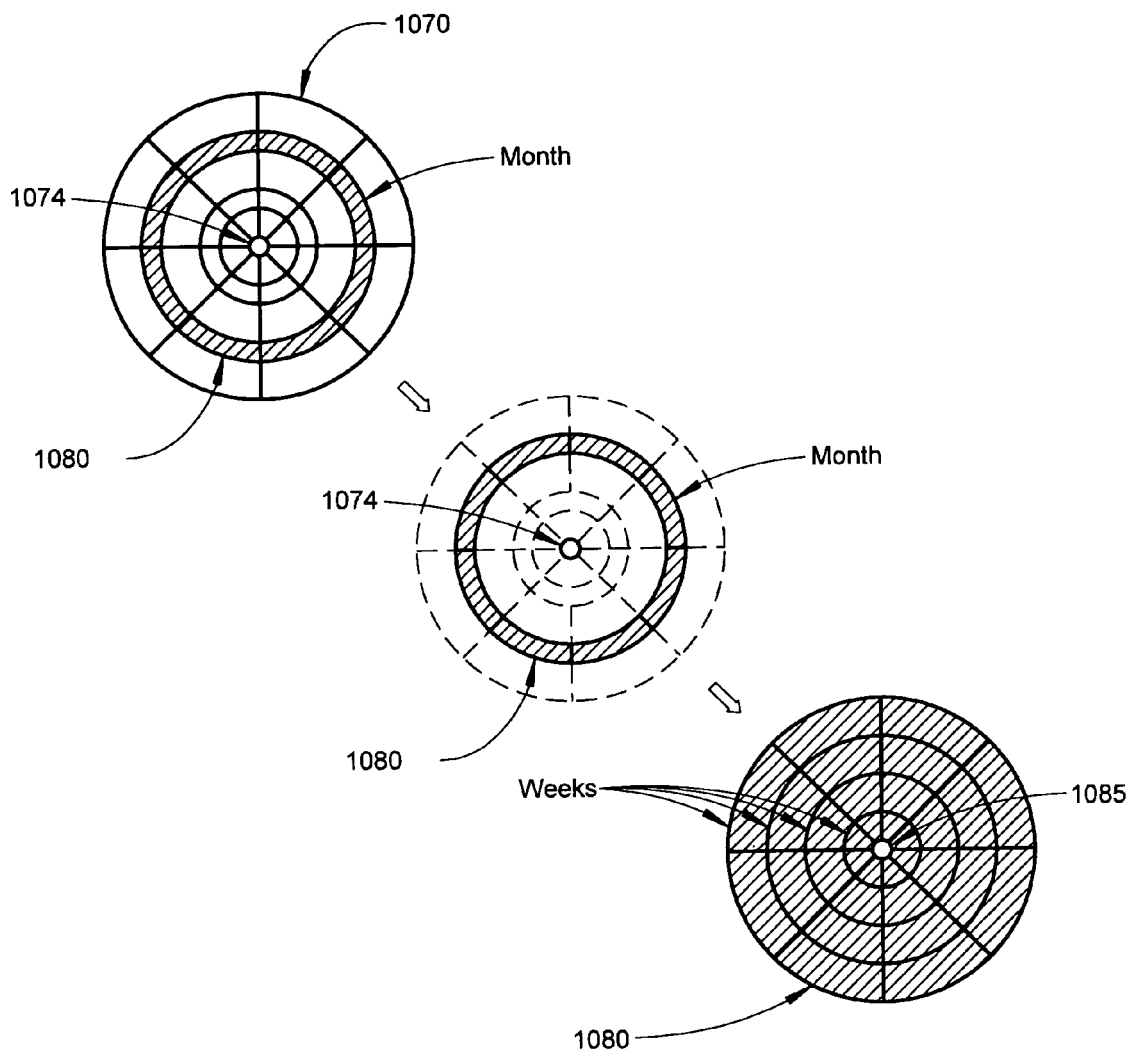
FIG. 10C is an example of a hierarchical relationship between time regions according to one embodiment of the present invention.

FIG. 10C is an example of a hierarchical relationship between time regions according to one embodiment of the present invention. In this example, a user may move from a time region to sub time regions in a hierarchical manner. For example, FIG. 10C shows a plurality of time regions for a project 1070. The time regions are arranged in a concentric manner around a central region 1074. In some cases, each time region may be associated with a plurality of sub time regions. For example, a time region 1080 associated with the project may include a plurality of sub time regions. These sub time regions may be used to zoom in on a particular time period (e.g., months to weeks). The central region 1085 may represent the completion of the time region associated with time region 1080. Thus, the focal point or central region may represent a point in time corresponding to a target end date of a project, an end date of a time region, or and end date of a group of related tasks or subtasks as in 10A-B. Accordingly, embodiments of the present invention may be used to manage time regions across multiple levels. In a software implementation a user may move between any of the time regions associated with a project and associated sub time regions of the project with a simple mouse click, for example. This "zoom in" and "zoom-out" function can be performed on any number of time regions together based on the user need such as dependencies, completion dates, status, etc.

Figure 11:
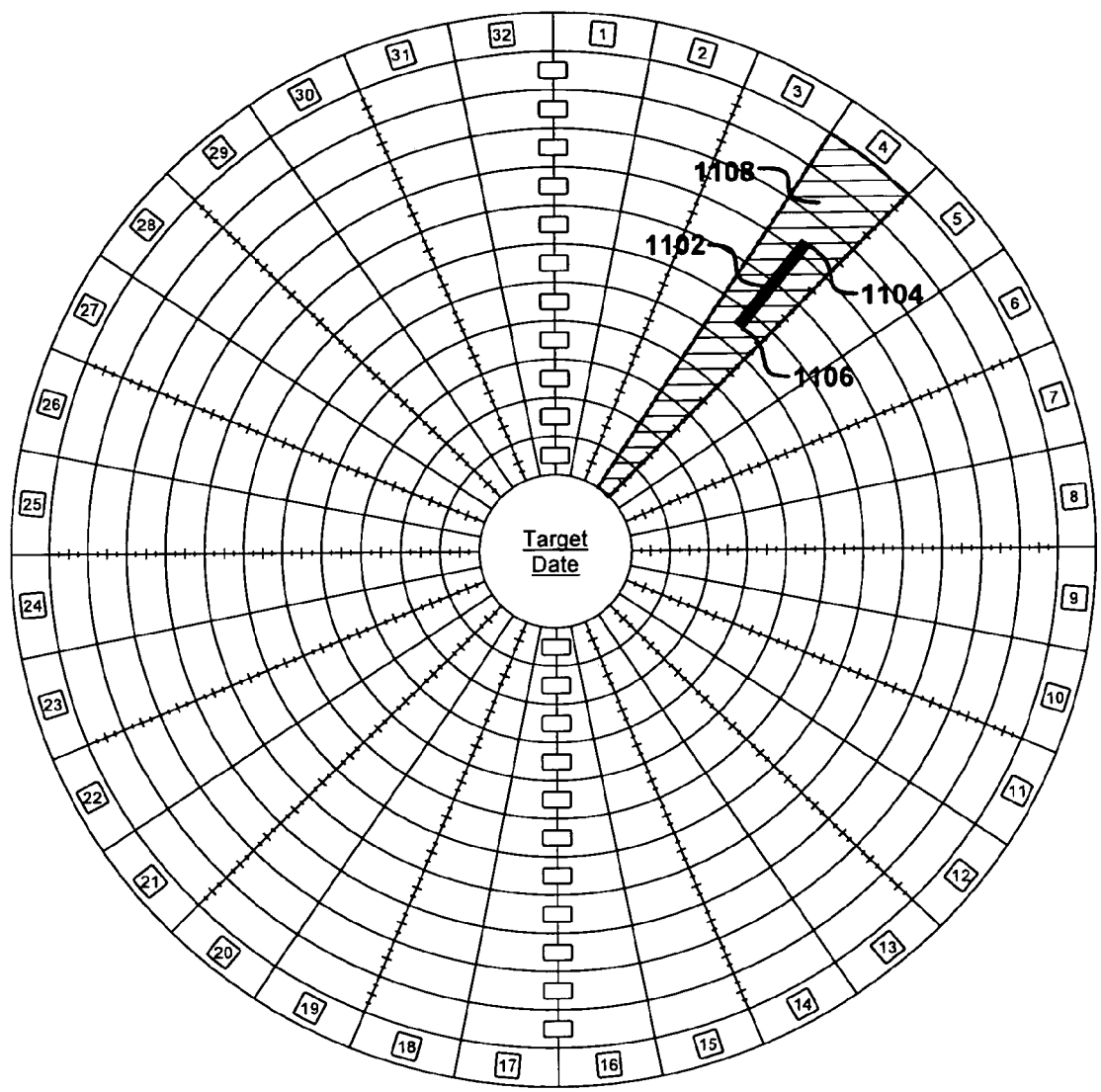
FIG. 11 is an example of a project management system including a task bar according to one embodiment of the present invention.

FIG. 11 is an example of a project management system including a task bar according to one embodiment of the present invention. In this example, a project management system 1100 includes a task bar 1102. The task bar 1102 is a marking that represents a task's projected duration. The task bar 1102 is positioned in a corresponding task region 1108. The task bar 1102 indicates a projected start time 1104 and a projected end time 1106 (e.g. due date) for a respective task associated with task region 1108. In this example, the end of the task bar 1102 that indicates the projected start time 1104 is oriented away from the central region, which is farther away in time from the target completion date. The end of the task bar 1102 that indicates the projected end time 1106 is oriented toward the central region, which is closer in time to the target completion date. For ease of illustration, only one task bar 1102 is shown. In an actual project management system, there are typically multiple task bars (e.g. at least one task bar per task region).

Figure 12:
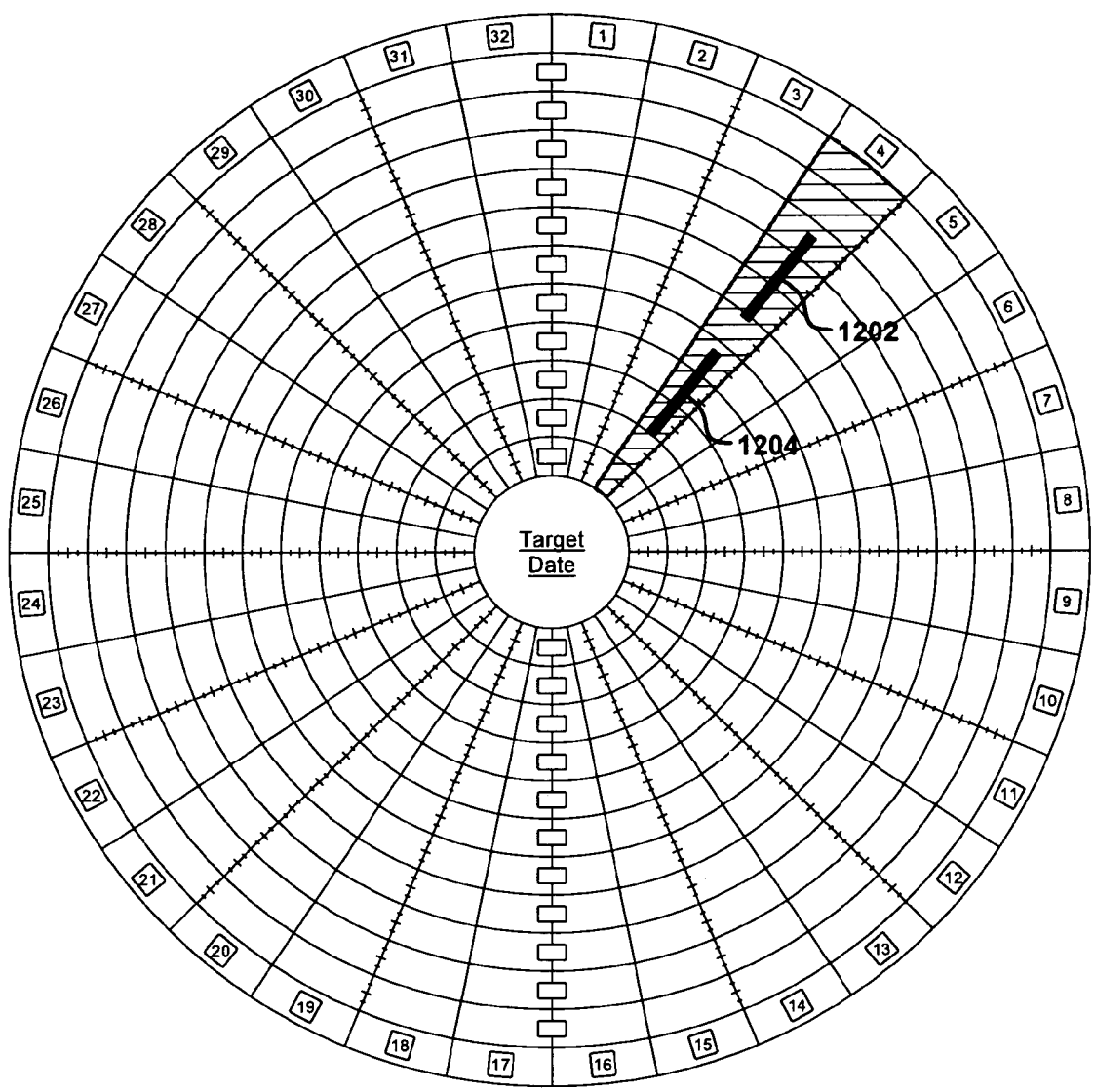
FIG. 12 is an example of a project management system including multiple task bars according to another embodiment of the present invention.

FIG. 12 is an example of a project management system including multiple task bars according to another embodiment of the present invention. In this example, project management system 1200 includes two task bars 1202 and 1204 indicating separate projected start times and end times for a particular task. This example illustrates a scenario that may take place when a particular task is completed in phases. Accordingly, the task regions can have multiple task bars in one task region where the task bars can be either sequential or concurrent.

Figure 13:
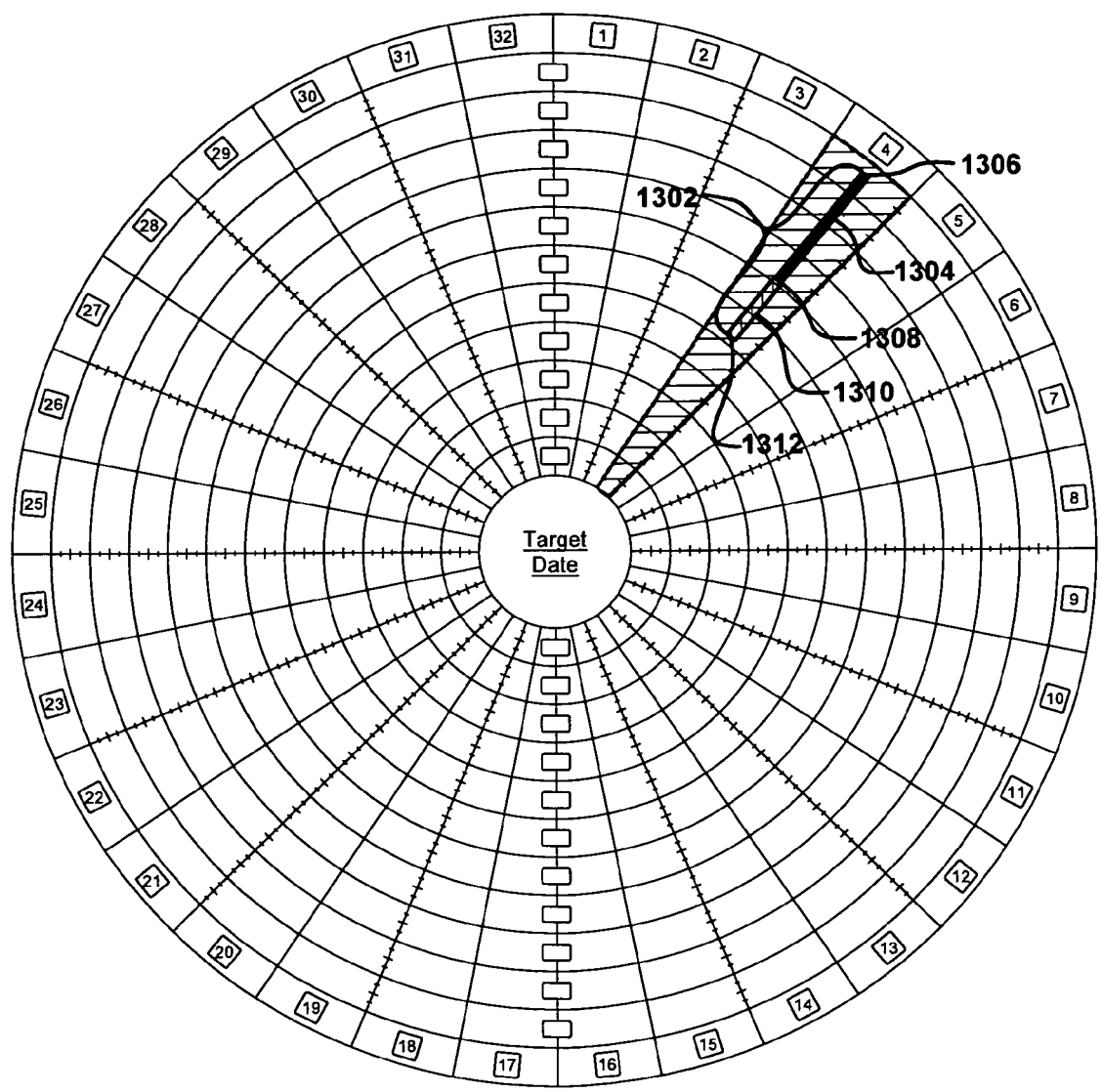
FIG. 13 is an example of a project management system including an extension according to one embodiment of the present invention.

FIG. 13 is an example of a project management system including an extension according to one embodiment of the present invention. In this example, task management system 1300 includes a task bar 1302 that indicates a projected time period and an extension time period. The task bar 1302 has one segment 1304 that indicates the projected period for completing a task. The segment 1304 indicates a projected start time 1306 and a projected end time 1308. Similarly, the task bar 1302 has another segment 1310 that represents the extension period for completing a task (i.e. additional time needed to complete the task). The segment 1310 indicates a beginning of the extension period at 1308 (same as the projected end time 1308) and indicates an extended end time at 1312.

In a specific embodiment, each segment 1304 and 1310 is color-coded to more clearly indicate the status of the respective task. For example, the segment 1304 may be black indicating a projected time period that begins at the projected start time 1306 and ends at the projected end time 1308. Similarly, the segment 1310 may be red indicating an extension time period that ends at the extended end time 1312. Of course, the specific colors will depend on the specific application. Alternatively, different shades (e.g. black, gray, etc.) or different patterns (e.g. solid, cross-hatch, dotted, etc.) can be used in lieu of colors to indicate the different segments 1304 and 1310.

Figure 14:
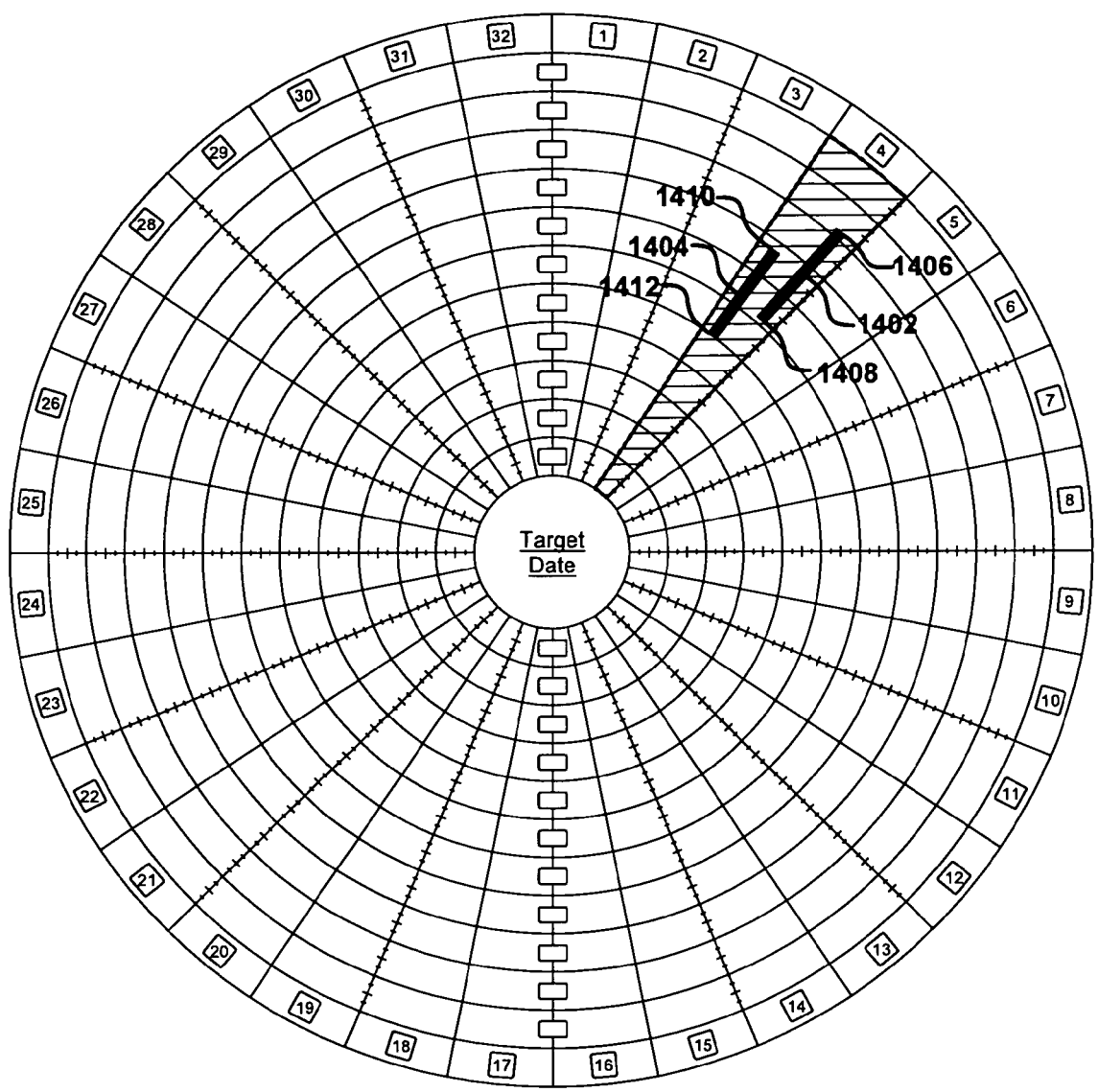
FIG. 14 is an example of a project management system including multiple task schedules according to one embodiment of the present invention.

FIG. 14 is an example of a project management system including a multiple task schedules according to one embodiment of the present invention. In this example, project management system 1400 includes a task bar 1402 that indicates a projected time period, and a task bar 1404 that indicates a new time period. For example, a new time period may be the result of a delayed start. Such task bars 1402 and 1404 may be used when tasks have delayed start and finish date adjustments. The task bar 1402 indicates a projected start time 1406 and a projected end time 1408. Similarly, the task bar 1404 indicates a new projected start time 1410 and a new projected end time 1412. The task bars 1402 and 1404 can be color-coded or otherwise marked with different shades or patterns to more clearly indicated the status of the respective task. The task bars 1402 and 1404 can also be overlaid onto one another in the task region.

Figure 15:
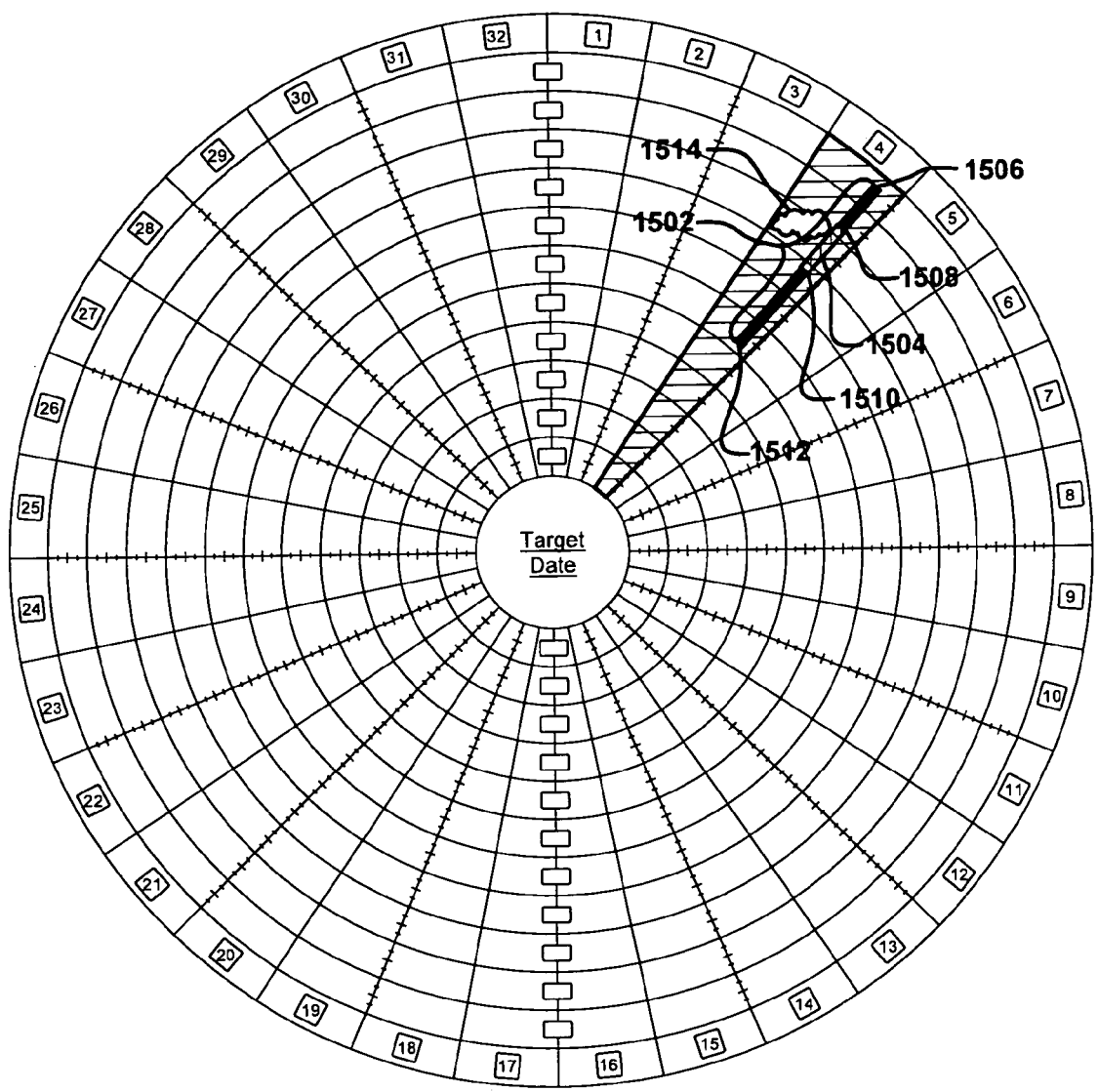
FIG. 15 is an example of a project management system including an indication of a weather delay according to one embodiment of the present invention.

FIG. 15 is an example of a project management system including an indication of a task delay according to one embodiment of the present invention. In this example, project management system 1500 includes a task bar 1502 that indicates a task delay, such as a weather delay. The task bar 1502 is used to indicate weather delays (e.g. rain, snow, etc.), which may have temporarily halted a particular task. The task bar 1502 has a delay segment 1504 that represents a temporary halt of the task. As such, the task bar 1502 indicates a projected start time 1506, a halt time 1508, and restart time 1510, and a new projected end time 1512. The different sections of the task bar 1502 can be color-coded or otherwise marked with different shades or patters to more clearly indicate the status of the respective task. A symbol 1514 (e.g. a cloud) is an example of a visual or iconic notation that may be included to indicate a weather delay, for example. A variety of other icons may be placed proximate to the delay segment 1504 to indicate a delay. Because the symbol 1514 indicates a weather delay, the symbol 1514 functions as a record to show which resource did not work during a particular period of time. Such a record may be used for maintaining a record of the project, which may be important for issues such as Workmen's Compensation Insurance because the record correlates whether a particular resource was actually on a job site during a specified time.

Figure 16:
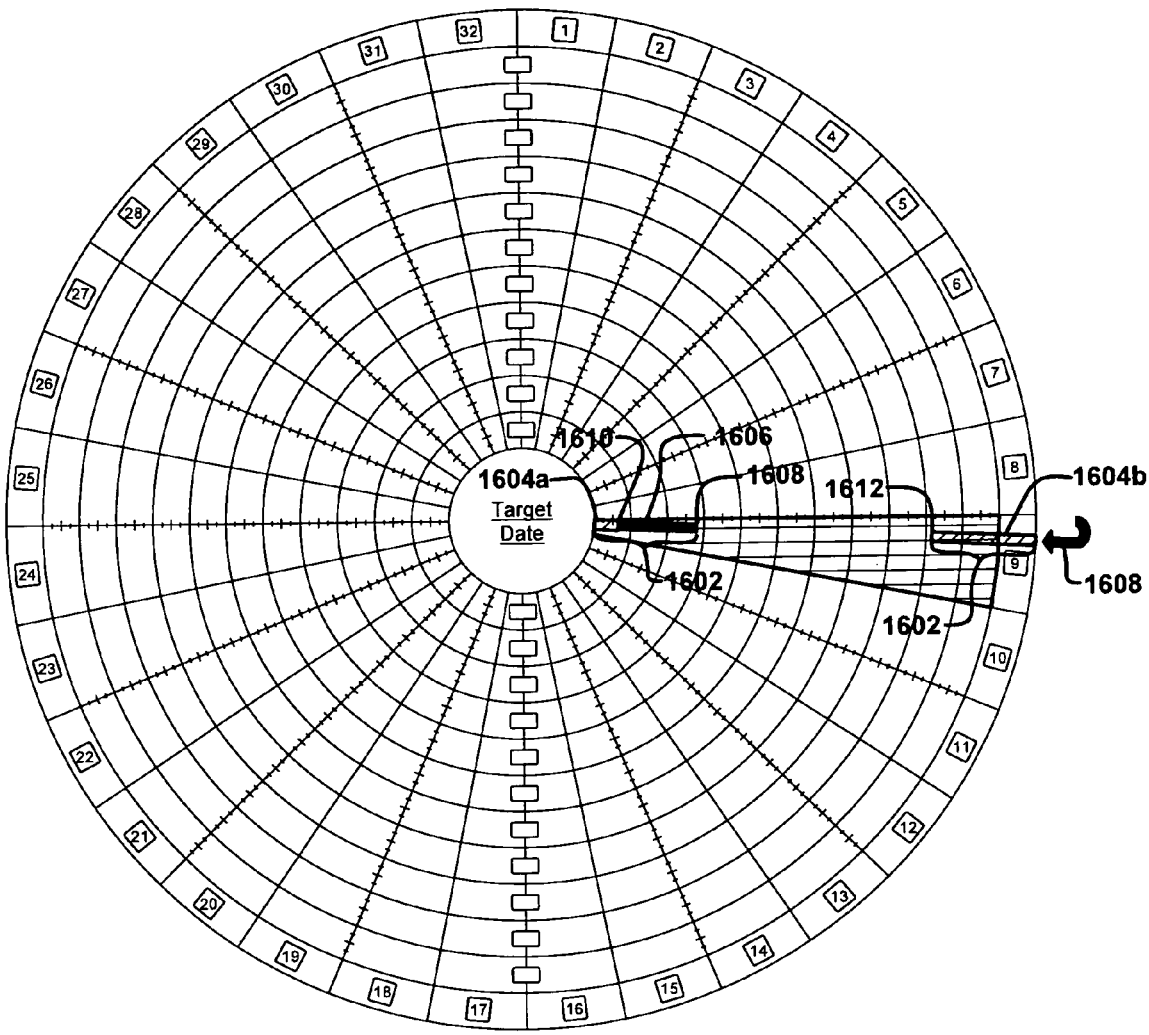
FIG. 16 is an example of a project management system including a loop extension in a task schedule according to one embodiment of the present invention.

FIG. 16 is an example of a project management system including a loop extension in a task schedule according to one embodiment of the present invention. In this example, project management system 1600 includes a task bar 1602 that indicates a loop extension period of time. The task bar 1602 may be used when a task has not been completed by the target due date of the entire project. The task bar 1602 has a projected segment 1606 that indicates a projected start time 1608 and a projected end time 1610. The task bar 1602 also has loop extension segments 1604a and 1604b that represent the loop extension period of time. The loop extension segment 1604a indicates the beginning part of the loop extension period of time that occurs before the target due date of the entire project. The loop extension segment 1604b indicates the end part of the loop extension period that occurs after the target due date of the entire project. As such, the loop extension segments 1604a and 1604b indicate the beginning of the extension period 1610 (same as the projected end time 1610) and indicates an extension end time 1612. The different segments of the task bar 1602 can be color-coded or otherwise marked with different shades or patterns to more clearly indicate the status of the respective task. The task bar 1602 also includes a loop marker 1608 to make the loop extension time period more visible.

Figure 17:
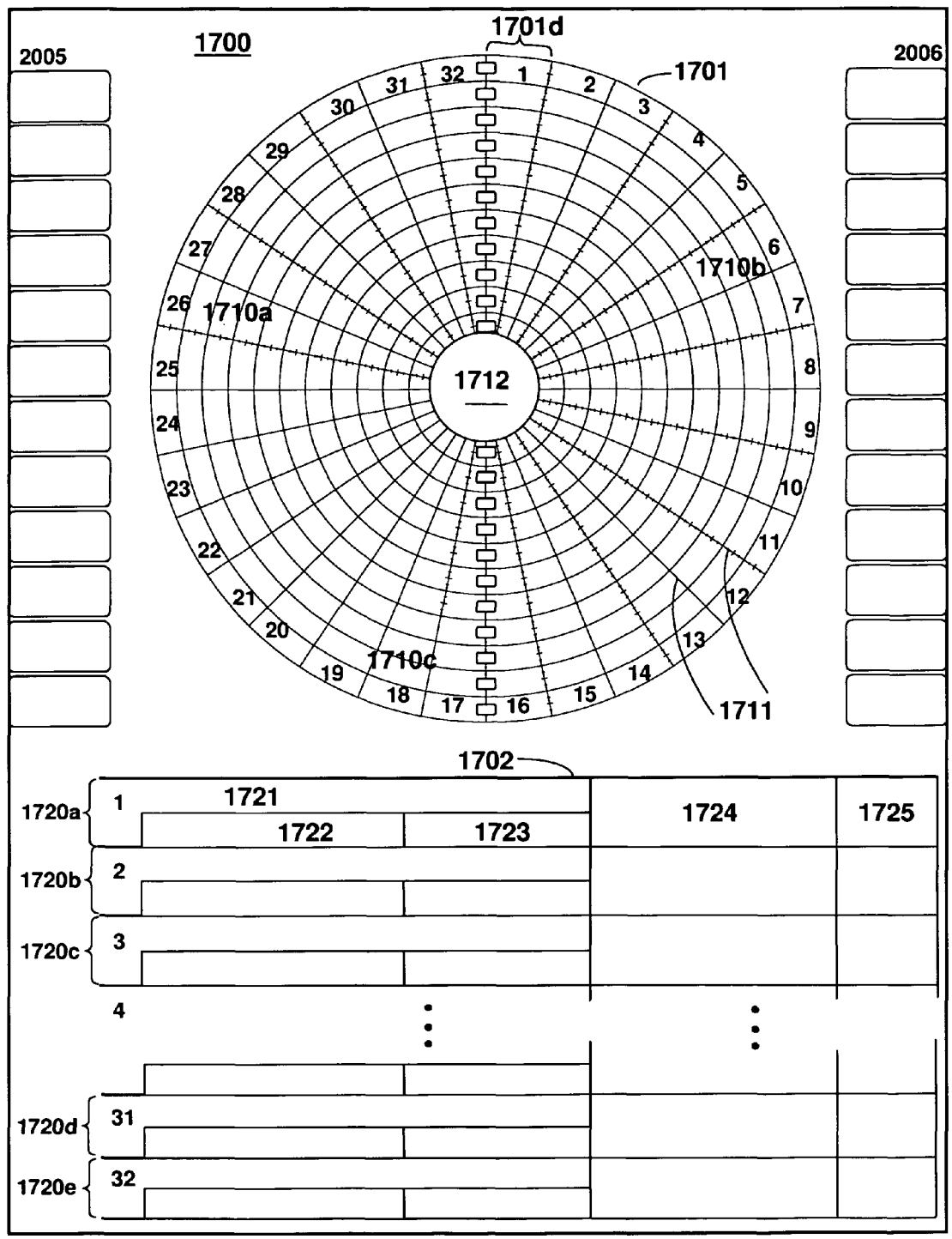
FIG. 17 is an example of a project management template according to one embodiment of the present invention.

FIG. 17 is an example of a project management template according to one embodiment of the present invention. Project management template 1700 is a physical manifestation of the project management system described above (i.e., versus a project management system implemented in software). Project management template 1700 includes a chart 1701 and a description region 1702. Chart 1701 may be used for implementing project management features described above, and description region 1702 may be used for recording information about the project and each task. For example, chart 1701 includes a plurality of task regions 1710 (e.g., 1710a, 1710b, and 1710c) between adjacent task boundaries 1711 that are arranged radially around a central region 1712. Description region 1702, which in this example is located below chart 1701, may include a plurality of task description records 1720a-e. One or more task description records in description region 1702 may be associated with a particular task region 1710, or one task description record may be associated with one or more task regions. In this example, there is one task region associated with each task description record. Such an association can be indicated by each description record sharing a visual marking that indicates an associated task region. Such an indication may be made using a number, icon, or other unique symbol that is shared by a task region and an associated task description record. For example, a task description record 1720a and a task region 1710d can both be numbered "1" to indicate their association. Each task description record may be used to record task information relevant to the particular task region to which it is associated. For example, description record 1720a may be used to record information relevant to the task associated with task region 1710d. Such task information may include vendor names, task descriptions, contact information (e.g., names, telephone numbers, emails), critical task identifications (described below) and/or descriptions, start dates, and due dates, to name just a few. Accordingly, each task description record may include a plurality of description fields 1721-1725 that each record different task information.

One example implementation of project management template 1700 is to print the chart 1701 and description region 1702 on a sheet of material. Project management template 1700 may be provided as a blank template onto which a user can manually enter information. For example, project management template 1700 may be printed on a sheet of paper. The surface of the paper may include an image of the chart 1701 and description region 1702 including a plurality of description records and description fields, for example. In one embodiment, project management template 1700 is printed on a sheet of material (e.g., paper), and a laminate layer (e.g., plastic or polymer) is placed on top of the sheet of material. Accordingly, a user may use erasable markers to write task bars and task information onto the chart. The information on the chart may be easily modified or deleted simply by erasing the markings. A variety of materials could be used for the sheet of material or the laminate. In one embodiment, the project management template is provided directly on a plastic sheet or other polymer. While this example may be implemented physically (e.g., as a printed product), embodiments of the present invention may also be implemented in software, wherein the chart 1700 is displayed to a user on a display and associated task information is stored in tables of a database (e.g., each description region may be a database record or object and each description field may be fields of a database table or database object).

FIG. 18 is an example of a description region portion of the project management template 1700 of FIG. 17 according to one embodiment of the present invention. The portion 1800 includes task description records 1802a-g, where each task description record 1802a-g includes task information recorded in task description fields 1803 (e.g., vendor "name" 1803a, "contact" 1803b, "phone" 1803c, "critical task" 1803d, and task "due date" 1803e). In a specific embodiment, each description record 1802a-g includes a numbered task box field that is associated with a particular task region on the chart and next to which other task information can be entered. Additionally, a specific resource can be issued several description records. This may be the case where one task region is associated with multiple tasks. For example, referring to description records 1802*e* and 1802*g*, the same vendor "Premium Construction" is assigned two tasks.

Figure 19:
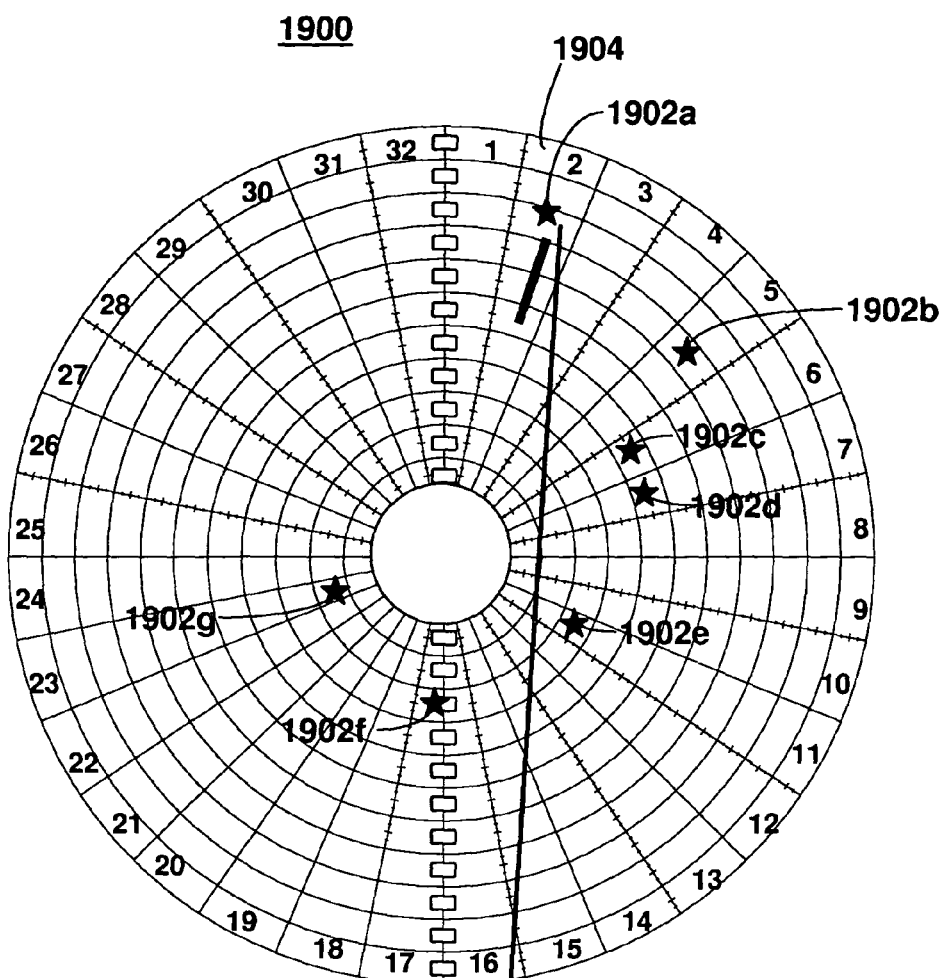
FIG. 19 is an example of the chart portion of the project management template of FIG. 17 according to one embodiment of the present invention.

FIG. 19 is an example of the chart portion of the project management template of FIG. 17 according to one embodiment of the present invention. In this example, project management template 1900 of FIG. 19 includes critical task markers 1902*a-g*. Critical tasks are tasks that must take place or the flow of work stops for one or more task regions. Critical task markers 1902*a-g* may be used to indicate dependencies among one or more tasks. Critical task markers 1902*a-g* may include symbols or other designations (e.g., icons) that correspond to critical tasks. For example, the task region 1904 (also labeled "2") has a critical task marker 1902*a*, which indicates that the task described in the description region 1906 (i.e. "Turn off gas and water on site") is a critical task. If a project includes a number of discrete tasks that must be accomplished in some set order for the project to be completed successfully, then there may be one or more critical tasks upon which later tasks depend. Often one task is dependent upon the successful completion of an earlier task. In some cases task interdependency dictates a certain order to the tasks. For example, walls may need to be put up before the roof can be installed. In some projects, a given task or family of related tasks is carried out by a particular resource. To facilitate representation of tasks (e.g., and corresponding resources) the display is divided into a plurality of pie-shaped wedges or 'slices' with each resource (or family of related tasks) occupying one slice.

Figure 20:
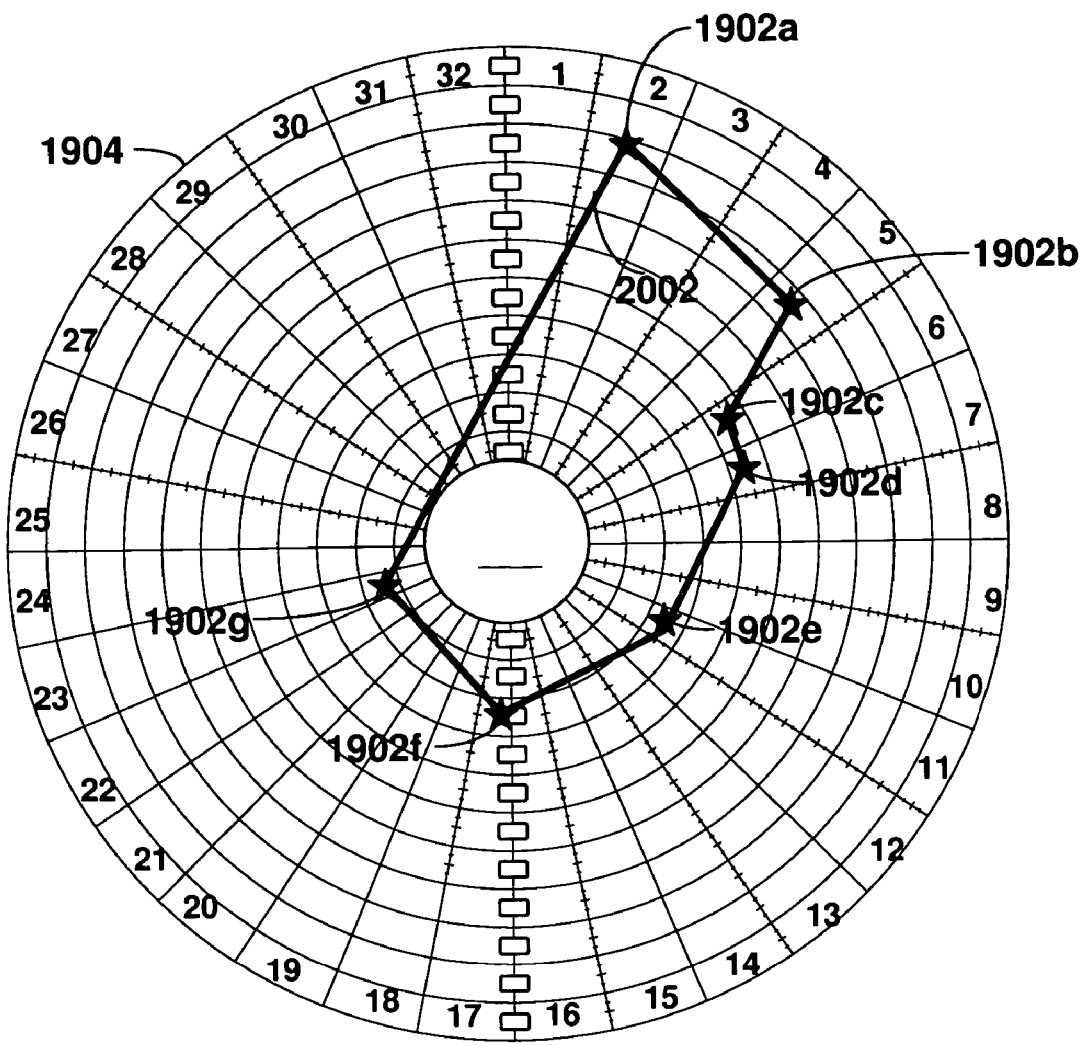
FIG. 20 is an example of the chart portion of the project management template of FIG. 17 according to another embodiment of the present invention.

FIG. 20 is an example of the chart portion of the project management template of FIG. 17 according to another embodiment of the present invention. In this example, the project management template includes a critical ring 2002. The critical ring 2002 connects the critical task markers 1902*a-g*. The critical ring 2002 can be created once the chart is completed. While each task region can have its own critical path, which can be independent from the others, the critical ring 2002 provides an overall project view of what is critical.

FIG. 21 is an example of a project management template according to one embodiment of the present invention. The project management template 2100 includes task regions 2102 and a description region 2104. In this example, each resource is keyed to a particular task region according to a shared number (e.g. "1" to "14"). The project management template 2100 can also assign a family of related tasks to each task region. The number of task regions can be conveniently adjusted to fit a given project. In this example, each task description record in the description region includes information about vendors, critical tasks and due dates, contacts, and phone numbers. Other task information may be included in other implementations. FIG. 22 is another example of a description region portion of a project management template according to one embodiment of the present invention.

FIG. 23 is an example of a description region portion of project management template according to one embodiment of the present invention. This example shows that a particular task can have subtasks and a duration as well as a due date associated with it. Accordingly, the description region 2300 includes description records with subtasks, task duration, and due date fields. Any one resource may have a number of temporally successive tasks that depend either on earlier tasks by the same resource or on tasks carried out by other resources. In this example, the list of tasks and subtasks are keyed to a resource or to a task family according to number. Task families may be used when one task region is associated with multiple tasks. When a project is initially planned, it may be convenient to place task bars in each task region to indicate the tasks and their duration. In a specific embodiment, as a project progresses, the actual date of task completion may be marked with a symbol such as an "X". At any given time a user can view the chart to ensure that all tasks in the past actually show completion signs. Any task not showing such a symbol may require immediate attention.

There may be cases where a very large number of resources or task families are involved, requiring an unwieldy number of separate task regions to be cut from the project management system. There may also be cases where it is desired to view only a portion of a project at one time. For example, one may not wish to give all of the project details to a particular individual. These cases are accommodated by "partial slice" diagrams in which only one or a select few task regions are shown.

Figure 24:
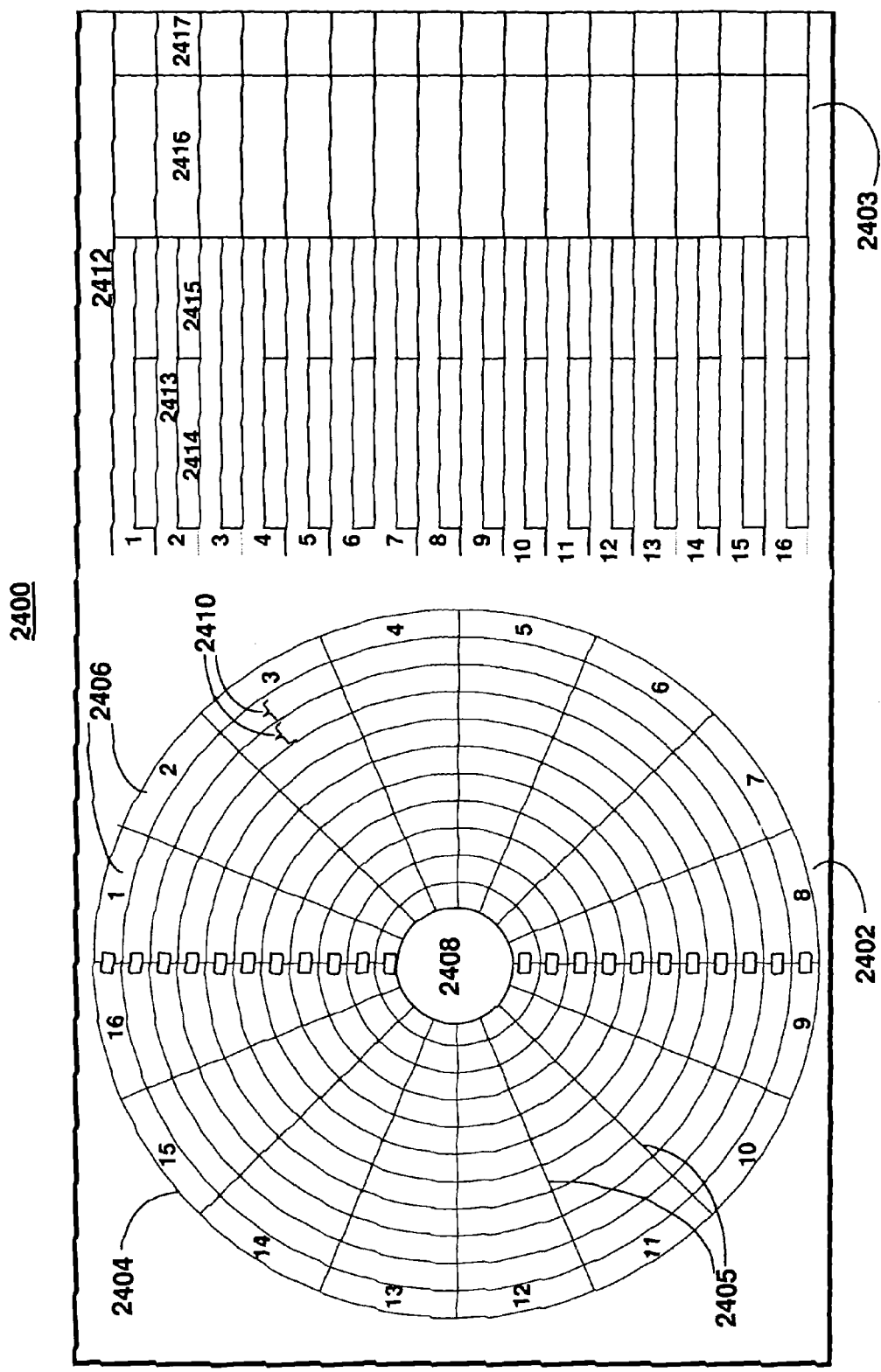
FIG. 24 is an example of a project management template according to one embodiment of the present invention.

FIG. 24 is another example of a project management template according to one embodiment of the present invention. The project management template 2400 includes a chart region 2402 and a description region 2403. In this example, the description region 2403 is located on the right side of chart region 2402. The chart region 2402 includes a chart 2404 having a plurality of task boundaries 2405 (e.g., timelines) arranged radially around a focal point, wherein a region between each task boundary corresponds to a task. The regions between the task boundaries are the task regions 2406. The task regions 2406 arranged radially around a central region 2408. Each task region 2406 is associated with a task of a plurality of tasks that constitute a project. The chart is further divided into time regions 2410 arranged concentrically around the central region 2408, wherein each time region 2410 represents a period of time. The description region 2403 includes a plurality of task description records 2412. The description records include a plurality of task description fields 2413-2417. Each description record 2412 is associated with a task region 2406. A user may write project information directly on the project management template 2400. Such project information includes some or all of the information described above in FIGS. 1-23 (e.g. task information, task identifiers, resource information, etc.). In a specific embodiment, the project management template 2400 has a clear laminate layer for receiving markings. The laminate layer may overlay the project management template 2400, or the template may be printed directly on the laminate. The laminate layer can be any type of laminate including plastic or a polymer. A user may then simply apply erasable markings to the laminate layer, for example, which can be removed and a new one applied to the chart 2400 as a project progresses. This allows for changes to be made to markings or for the chart 2400 to be reused.

In another embodiment of the present invention, the project management system 2400 has paper "tear off" sheets that attach to areas of the project management system 2400 (e.g. at the bottom). The "tear off" sheets may be implemented as a specific size/shape notepad. For example, one half of the bottom may be a list of daily actions that gets "ripped off" at the end of the day.

Figure 25:
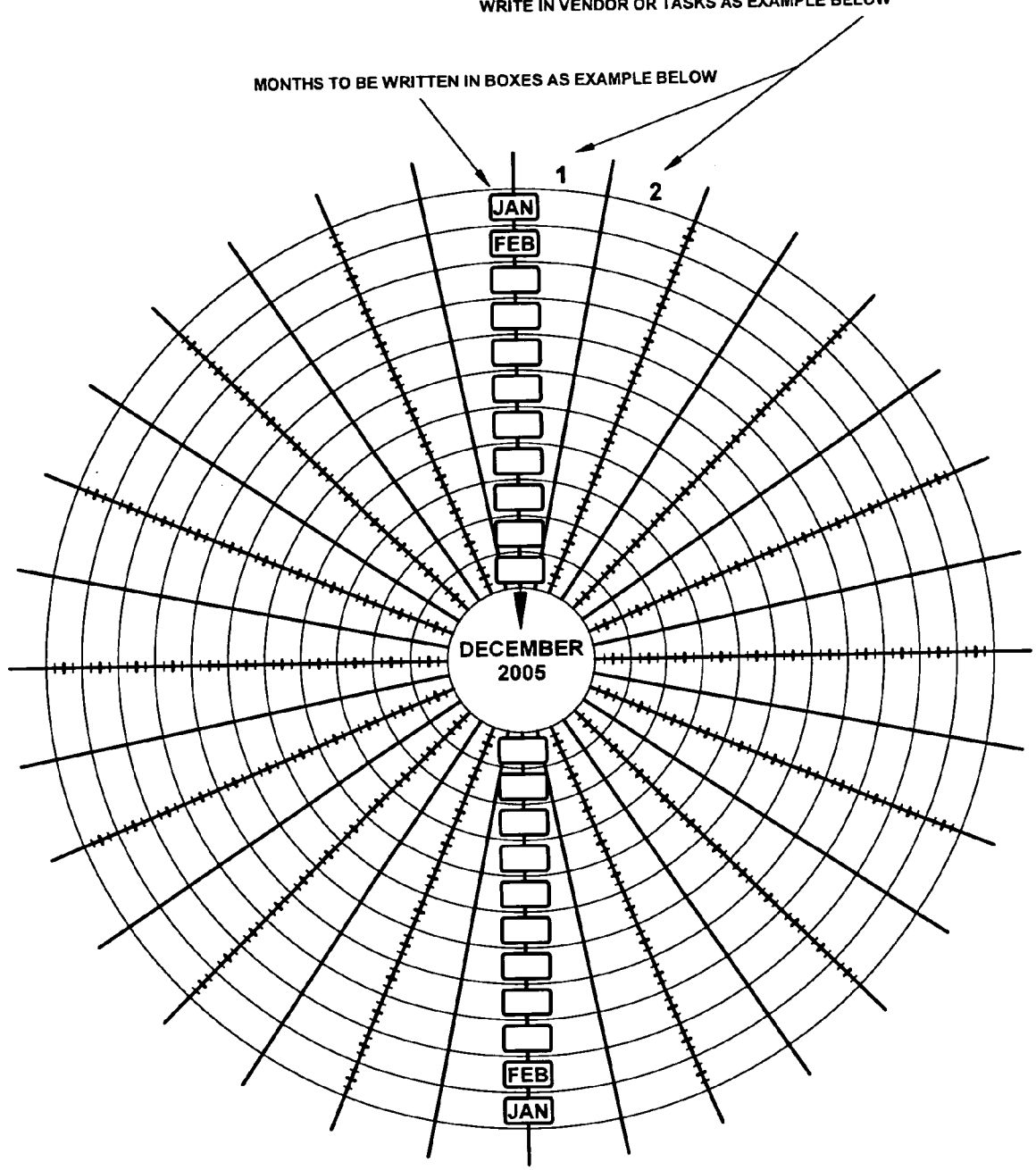
FIG. 25 is an example of a project management template according to one embodiment of the present invention.

FIG. 25 is an example of a project management template 2500 according to one embodiment of the present invention. As described above, embodiments of the present invention can be implemented in a variety of manners. Project management system 2500 is a preprinted chart that includes empty timelines that may be written in manually. For example, a user selects a target date and fills in the central region with this date and inserts the appropriate time increments (e.g. January, February, etc.). The start date and end date may implicate the time period. For example, if the start date is January and the end date is in December, the time regions may be in monthly increments. Months may be written in boxes on the chart as illustrated in FIG. 25. This obviates the need to preprint multiple charts to cover all possible starting dates, end dates, and time intervals. The user may fill in the task information in a blank task table (e.g., in a description region on the same chart as describe above or on a separate chart) and may write in vendor or task numbers corresponding to each task region. Task identifiers may be entered into the task regions on the chart (e.g., using contrasting colors). As mentioned above, such a chart can be coated with a special surface for use with erasable markers. Since the surface is erasable, it is simple to update the information as the project progresses and to make whatever corrections are necessary.

Figure 26:
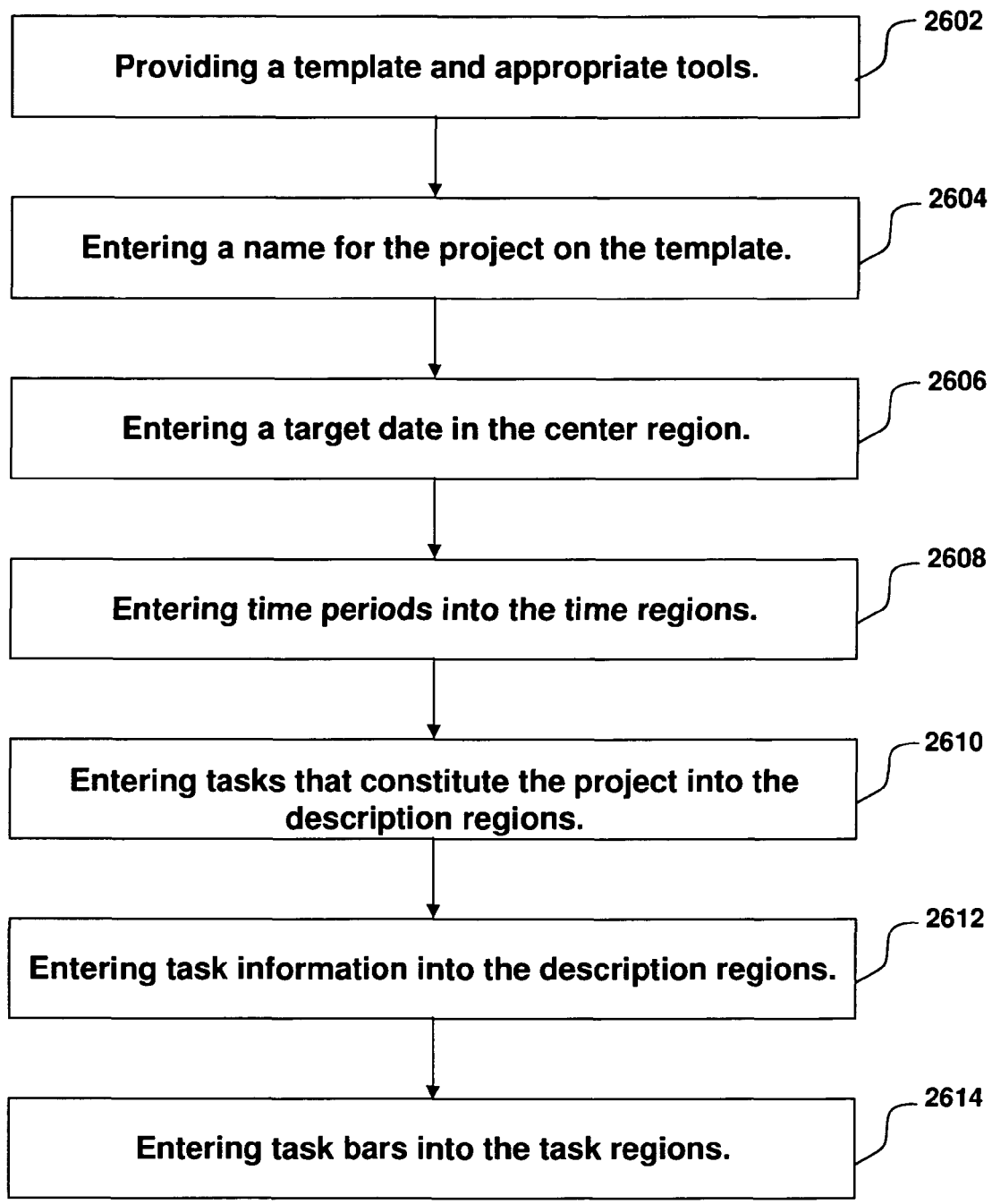
FIG. 26 illustrates a method according to one embodiment of the present invention.

FIG. 26 illustrates a method according to one embodiment of the present invention. The process begins in step 2602 where the project management system and appropriate tools are provided. If a project management system is implemented using a software on a computer, markers will not be required. If a blank project management template is used, markers (e.g., erasable or permanent markers) may be appropriate. For example, a black ultra fine point permanent or erasable marker may be used to draw task bars. Other embodiments may use other forms of task identifiers. The black color may be used to illustrate the original start to finish time for each task. An red ultra fine point marker may be used to draw delays, extension periods of time, critical tasks, and critical task due dates, etc. The specific colored markers will depend on the specific application. White board cleaner for dry-erase surfaces or alcohol and a cloth or paper towel may be used for erasing the markings.

At step 2604, a name for the project may be entered onto the project management template such as in a "project" field. At step 2606, a target date is entered in the central region. At step 2608, time periods are entered into the time regions. First, the duration of the project is determined. As described above, the time regions may represent different spans of time such as a month, week, day, or any other time period the user finds useful. For example, the time periods entered may be the months of the year such as "January", "February", etc. At step 2610, the tasks that constitute the project are entered into the description regions. Critical tasks may also be identified. At step 2612, task information is entered into the description regions. As described above, such task information may include resource names, contact names and phone numbers, for example. At step 2614, task bars are entered into the task regions. As described above, extension time periods, loop extension time periods, delayed time periods, weather delays, etc. may be added.

According to the system and method disclosed herein, the present invention provides numerous benefits. For example, a user can view the overall project and the details of the tasks that constitute the project simultaneously in a simple, intuitive, visually meaningful, and compact one-page presentation. Furthermore, embodiments of the present invention maintain as much scheduling freedom as possible when managing projects. Embodiments of the present invention also enable a user to schedule, view and manage as many concurrent tasks as possible in order to shorten the length of a project. Furthermore, the project target date being positioned at the focal point of the chart functions as a psychological barrier to extending deadlines.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, embodiments of the present invention may include some or all of the innovative features described above. Also, the present invention can be implemented using physical material, software, a computer readable medium containing program instructions, or a combination thereof. Software written according to the present invention may be stored either in some form of computer-readable medium such as memory or CD-ROM, or may be transmitted over a network such as the internet. Such software may be executed by any of a variety of electronic devices such as a computer system. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
storing data in a memory of a computer system, the data corresponding to a project, the project comprising a plurality of tasks;
generating an electronic chart on the computer system based on the data in said memory, the electronic chart comprising a plurality of task regions separated by task boundaries, wherein the plurality of tasks are displayed in corresponding task regions, wherein each task region corresponds to one particular task, wherein the task regions are arranged to form a symmetric geometric shape around a geometric center, the task regions forming wedge shapes that extend outward from the center, wherein the task boundaries extend radially outward from the center between the task regions, the task boundaries representing timelines, and wherein the center represents to a point in time stored in said data corresponding to the particular project, and wherein durations of the plurality of tasks are indicated radially along the task boundaries, wherein each of the plurality of tasks is displayed between a first radial position having a first radial distance from the center corresponding to a first time and a second radial position having a second radial distance from the center corresponding to a second time; and
outputting the electronic chart to a display of the computer system.

2. The method of claim 1, the electronic chart further comprising a plurality of concentric time regions around the center, wherein different boundaries of the concentric time regions intersect the task boundaries at different points, and wherein a radial distance between the boundaries of each concentric time region represents an increment of time.

3. The method of claim 1, the electronic chart further comprising one or more task identifiers for indicating the duration of a task corresponding to a task region, wherein at least one task region includes one or more task identifiers extending radially from a first point in time to a second point in time.

4. The method of claim 1 wherein each task region is associated with data corresponding to a task of said project.

5. The method of claim 1 wherein each task boundary represents time advancing inward toward the center.

6. The method of claim 1 wherein each task boundary represents time advancing outward away from the center.

7. The method of claim 1 wherein the task boundaries comprise increments of time, and wherein the increments of time are defined by a user.

8. The method of claim 1 wherein the geometric center comprises a central region having said geometric shape.

9. The method of claim 8 wherein the central region is a circle.

10. The method of claim 1 wherein the geometric shape is a circle.

11. The method of claim 1 wherein the center represents to a project completion date stored in said data corresponding to the project.

12. The method of claim 1, the electronic chart further comprising a plurality of concentric circles around the center, wherein the concentric circles intersect the task boundaries at different points, wherein a difference in radii of adjacent circuits represents an increment of time.

13. The method of claim 12 wherein the increment of time is user definable.

14. The method of claim 1 wherein the data is stored in a database, and wherein each task has corresponding data stored in a plurality of fields in the database, and wherein a particular task region corresponding to a task is associated with the plurality of fields in the database for said task.

15. The method of claim 1, the electronic chart further comprising a description region, the description region comprising a plurality of task description records, wherein the task description records display data associated with task regions.

16. A computer readable storage medium comprising instructions, the instructions when executed by a computer system causing the computer system to perform a method, the method comprising:
   storing data in a memory of a computer system, the data corresponding to a project, the project comprising a plurality of tasks;
   generating an electronic chart on the computer system based on the data in said memory, the electronic chart comprising a plurality of task regions separated by task boundaries, wherein the plurality of tasks are displayed in corresponding task regions, wherein each task region corresponds to one particular task, wherein the task regions are arranged to form a symmetric geometric shape around a geometric center, the task regions forming wedge shapes that extend outward from the center, wherein the task boundaries extend radially outward from the center between the task regions, the task boundaries representing timelines, and wherein the center represents to a point in time stored in said data corresponding to the particular project, and wherein durations of the plurality of tasks are indicated radially along the task boundaries, wherein each of the plurality of tasks is displayed between a first radial position having a first radial distance from the center corresponding to a first time and a second radial position having a second radial distance from the center corresponding to a second time; and
   outputting the electronic chart to a display of the computer system.

17. The computer readable storage medium of claim 16, the electronic chart further comprising a plurality of concentric time regions around the center, wherein different boundaries of the concentric time regions intersect the task boundaries at different points, and wherein a radial distance between the boundaries of each concentric time region represents an increment of time.

18. The computer readable storage medium of claim 16, the electronic chart further comprising one or more task identifiers for indicating the duration of a task corresponding to a task region, wherein at least one task region includes one or more task identifiers extending radially from a first point in time to a second point in time.

19. The computer readable storage medium of claim 16 wherein each task region is associated with data corresponding to a task of said project.

20. The computer readable storage medium of claim 16 wherein each task boundary represents time advancing inward toward the center.

21. The computer readable storage medium of claim 16 wherein each task boundary represents time advancing outward away from the center.

22. The computer readable storage medium of claim 16 wherein the task boundaries comprise increments of time, and wherein the increments of time defined by a user.

23. The computer readable storage medium of claim 16 wherein the geometric center comprises a central region having said geometric shape.

24. The computer readable storage medium of claim 23 wherein the central region is a circle.

25. The computer readable storage medium of claim 16 wherein the geometric shape is a circle.

26. The computer readable storage medium of claim 16 wherein the center represents to a project completion date stored in said data corresponding to the project.

27. The computer readable storage medium of claim 16, the electronic chart further comprising a plurality of concentric circles around the center, wherein the concentric circles intersect the task boundaries at different points, wherein a difference in radii of adjacent circuits represents an increment of time.

28. The computer readable storage medium of claim 27 wherein the increment of time is user definable.

29. The computer readable storage medium of claim 16 wherein the data is stored in a database, and wherein each task has corresponding data stored in a plurality of fields in the database, and wherein a particular task region corresponding to a task is associated with the plurality of fields in the database for said task.

30. The computer readable storage medium of claim 16, the electronic chart further comprising a description region, the description region comprising a plurality of task description records, wherein the task description records display data associated with task regions.

* * * * *